(12) United States Patent
Derrick et al.

(10) Patent No.: US 11,236,987 B2
(45) Date of Patent: Feb. 1, 2022

(54) LOAD BEARING STRUCTURE

(71) Applicant: RENISHAW PLC, Wotton-under-Edge (GB)

(72) Inventors: Hugo George Derrick, Stroud (GB); Stephen Paul Hunter, Chipping Sodbury (GB); David Andrew Larkham, Bristol (GB); David Roberts McMurtry, Stancombe (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 16/493,968

(22) PCT Filed: Apr. 17, 2018

(86) PCT No.: PCT/GB2018/050996
§ 371 (c)(1),
(2) Date: Sep. 13, 2019

(87) PCT Pub. No.: WO2018/193230
PCT Pub. Date: Oct. 25, 2018

(65) Prior Publication Data
US 2020/0309500 A1    Oct. 1, 2020

(30) Foreign Application Priority Data
Apr. 19, 2017  (EP) .................................. 17275052

(51) Int. Cl.
*G01B 11/00* (2006.01)
*G01B 5/00* (2006.01)
(Continued)

(52) U.S. Cl.
CPC .......... *G01B 11/005* (2013.01); *G01B 5/0004* (2013.01); *G01B 5/004* (2013.01);
(Continued)

(58) Field of Classification Search
CPC ...... G01B 11/005; G01B 5/008; G01B 21/04; G01B 7/008
(Continued)

(56) References Cited

U.S. PATENT DOCUMENTS 2,516,020 A   7/1950   Reed
2,789,480 A   4/1957   Wellauer
(Continued)

FOREIGN PATENT DOCUMENTS

CN   2627338 Y     7/2004
CN   101111651 A   1/2008
(Continued)

OTHER PUBLICATIONS

"Linear Ball Bushings"; Automotion Components brochure; automotioncomponents.co.uk; pp. 544-609.
(Continued)

*Primary Examiner* — Christopher W Fulton
(74) *Attorney, Agent, or Firm* — Oliff PLC

(57) ABSTRACT

A coordinate positioning apparatus having a load bearing structure. The load bearing structure has at least one elongate corner piece providing at least two bearing surfaces, one on each side of the corner, for a carriage moveable along the load bearing structure, and at least one piece of sheet material which extends along the at least one elongate corner piece and provides at least one load bearing facet.

14 Claims, 22 Drawing Sheets

(51) Int. Cl.
    *G01B 21/04*     (2006.01)
    *G01B 7/004*     (2006.01)
    *G01B 5/008*     (2006.01)
    *G01B 5/004*     (2006.01)
    *G01B 5/012*     (2006.01)

(52) U.S. Cl.
    CPC ........... *G01B 5/0007* (2013.01); *G01B 5/008* (2013.01); *G01B 5/012* (2013.01); *G01B 7/004* (2013.01); *G01B 11/002* (2013.01); *G01B 21/04* (2013.01)

(58) Field of Classification Search
    USPC .......................................................... 33/503
    See application file for complete search history.

(56) References Cited

U.S. PATENT DOCUMENTS

| | | | |
|---|---|---|---|
| 3,681,979 | A | 8/1972 | Hammond, Jr. |
| 3,749,501 | A | 7/1973 | Wieg |
| 3,818,596 | A | 6/1974 | Stemple et al. |
| 3,831,283 | A | 8/1974 | Pagella et al. |
| 4,138,822 | A | 2/1979 | Parodi et al. |
| 4,207,680 | A | 6/1980 | Bell et al. |
| 4,213,244 | A | 7/1980 | Bell et al. |
| 4,229,136 | A | 10/1980 | Panissidi |
| 4,389,781 | A | 6/1983 | Donaldson |
| 4,507,868 | A | 4/1985 | Tuss |
| 4,651,439 | A | 3/1987 | Band et al. |
| 4,680,868 | A | 7/1987 | Orr et al. |
| 4,799,316 | A | 1/1989 | Tuss |
| 4,856,752 | A * | 8/1989 | Linn ................ B23Q 1/015 248/678 |
| 4,882,847 | A | 11/1989 | Hemmelgarn et al. |
| 4,930,809 | A * | 6/1990 | Lindsay ................ B60P 3/32 280/789 |
| 4,949,465 | A | 8/1990 | Pesikov |
| 4,963,217 | A * | 10/1990 | Pavone ................ B23Q 1/032 156/292 |
| 4,964,220 | A | 10/1990 | Orr et al. |
| 5,001,842 | A * | 3/1991 | Wright ................ G01B 5/0011 33/503 |
| 5,033,174 | A * | 7/1991 | Zieve ................ B23Q 1/012 29/34 B |
| 5,063,683 | A | 11/1991 | Bury |
| 5,094,549 | A | 3/1992 | Lyon |
| 5,125,163 | A | 6/1992 | Bury |
| 5,173,613 | A | 12/1992 | Henry et al. |
| 5,208,994 | A | 5/1993 | McMurtry et al. |
| 5,247,749 | A | 9/1993 | Bury |
| 5,257,461 | A * | 11/1993 | Raleigh ................ G01B 5/008 33/1 M |
| 5,287,629 | A | 2/1994 | Pettersson |
| 5,388,342 | A | 2/1995 | Garau et al. |
| 5,388,343 | A | 2/1995 | Garau et al. |
| 5,402,981 | A | 4/1995 | McMurtry |
| 5,505,004 | A | 4/1996 | Pettersson |
| 5,621,978 | A | 4/1997 | Sarauer |
| 5,758,429 | A | 6/1998 | Farzan et al. |
| 5,832,416 | A | 11/1998 | Anderson |
| 5,848,480 | A | 12/1998 | Sola et al. |
| 5,881,470 | A * | 3/1999 | Hindman ................ G01B 5/004 33/1 M |
| 6,050,048 | A | 4/2000 | Hellsten |
| 6,058,618 | A | 5/2000 | Hemmelgarn et al. |
| 6,161,298 | A | 12/2000 | Bernhardt et al. |
| 6,202,316 | B1 | 3/2001 | Swift et al. |
| 6,272,760 | B1 * | 8/2001 | Wiedmann ................ G01B 5/008 33/1 M |
| 6,397,485 | B1 | 6/2002 | McMurtry |
| 6,829,838 | B1 * | 12/2004 | Weekers ................ G01B 5/0014 33/503 |
| 6,834,471 | B2 | 12/2004 | Takagi et al. |
| 7,191,541 | B1 | 3/2007 | Weekers et al. |
| 7,533,574 | B2 | 5/2009 | McMurtry et al. |
| 8,201,383 | B2 * | 6/2012 | Garau ................ E04C 3/06 52/831 |
| 8,375,594 | B1 | 2/2013 | Guenther |
| 8,739,420 | B2 | 6/2014 | Tarizzo |
| 9,038,282 | B2 | 5/2015 | McMurtry et al. |
| 9,109,747 | B2 | 8/2015 | Schernthaner |
| 10,646,883 | B2 * | 5/2020 | Hunter ................ G01B 5/0004 |
| 2003/0037451 | A1 | 2/2003 | Sarauer |
| 2003/0218457 | A1 | 11/2003 | Aiba et al. |
| 2004/0250434 | A1 | 12/2004 | Ogura et al. |
| 2004/0250503 | A1 | 12/2004 | Bigelow |
| 2005/0097766 | A1 | 5/2005 | Weekers et al. |
| 2006/0144005 | A1 | 7/2006 | Tonyan et al. |
| 2007/0040453 | A1 | 2/2007 | Aoki et al. |
| 2007/0220767 | A1 | 9/2007 | Pettersson |
| 2010/0018153 | A1 | 1/2010 | Garau |
| 2012/0041712 | A1 | 2/2012 | Pettersson |
| 2012/0167402 | A1 | 7/2012 | Verdi et al. |
| 2013/0227851 | A1 * | 9/2013 | Singh ................ G01B 5/008 33/503 |
| 2015/0028699 | A1 | 1/2015 | Hofstetter et al. |

FOREIGN PATENT DOCUMENTS

| Country | Number | | Date |
|---|---|---|---|
| CN | 101660900 | A | 3/2010 |
| CN | 103835434 | A | 6/2014 |
| CN | 103982587 | A | 8/2014 |
| CN | 101563510 | B | 9/2014 |
| CN | 205798952 | U | 12/2016 |
| DE | 3107783 | A1 | 9/1982 |
| DE | 4132655 | A1 | 4/1993 |
| DE | 4325337 | A1 | 2/1994 |
| DE | 44 08 912 | A1 | 12/1994 |
| DE | 4345094 | A1 | 7/1995 |
| DE | 29705152 | U1 | 7/1997 |
| DE | 3927525 | C2 | 3/1998 |
| DE | 10055188 | A1 | 5/2002 |
| DE | 10215188 | A1 | 10/2003 |
| DE | 103 26 247 | A1 | 1/2005 |
| DE | 102004047525 | A1 | 4/2006 |
| DE | 102006027898 | B3 | 7/2007 |
| DE | 10 2013 219 487 | A1 | 4/2015 |
| DE | 102016101695 | A1 | 8/2016 |
| EP | 0268659 | B1 | 9/1991 |
| EP | 0589565 | A2 | 3/1994 |
| EP | 0957332 | A2 | 11/1999 |
| EP | 1 018 669 | A2 | 7/2000 |
| EP | 1 347 337 | A2 | 9/2003 |
| EP | 1 463 185 | A2 | 9/2004 |
| EP | 1500903 | A1 | 1/2005 |
| EP | 1500903 | B1 | 5/2012 |
| EP | 2089592 | B1 | 1/2013 |
| EP | 3 032 218 | A1 | 6/2016 |
| EP | 1854577 | B1 | 6/2016 |
| FR | 1397480 | A | 4/1965 |
| GB | 2095143 | A | 9/1982 |
| GB | 2 262 319 | B | 3/1995 |
| JP | S61-90850 | A | 5/1986 |
| JP | H05-312556 | A | 11/1993 |
| JP | H08-114442 | A | 5/1996 |
| JP | 2003-309963 | A | 10/2003 |
| SU | 1167413 | A1 | 7/1985 |
| TW | 201237365 | A | 9/2012 |
| WO | 87/07711 | A1 | 12/1987 |
| WO | 88/02471 | A1 | 4/1988 |
| WO | 89/09677 | A1 | 10/1989 |
| WO | 89/09887 | A1 | 10/1989 |
| WO | 91/03145 | A1 | 3/1991 |
| WO | 01/85403 | A1 | 11/2001 |
| WO | 2005/043552 | A1 | 5/2005 |
| WO | 2007/093789 | A1 | 8/2007 |
| WO | 2007/128431 | A2 | 11/2007 |

(56) References Cited

FOREIGN PATENT DOCUMENTS

WO    2007/144906 A1    12/2007
WO    2010/106079 A1     9/2010

OTHER PUBLICATIONS

Thomson; "Thomson RoundWay Linear Roller Bearings"; Thomson brochure; www.thompsonlinear.com; pp. 1-6.

Thompson; "RoundWay Roller Bearings"; Thomson web page; http://www.thomsonlinear.com/website/com/eng/products/linear_guides/linear_specialty; [retrieved Sep. 5, 2014].

Connelly, R.; "The basics of rigidity: Lectures I and II, Session on Granlular Matter Institut Henri Poincaré"; Cornell University; http://www.math.cornell.edu/~connelly/BasicsI.BasicsII.pdf.

Ziegert, John; "Design and Testing of a High Speed, 5-DOF, Coordinate Measuring Machine with Parallel Kinematic Structure"; University of Florida; pp. 1-4.

"I-beam"; Wikipedia article; pp. 1-5; https://en.wikipedia.org/wiki/I-beam; accessed Jan. 24, 2019.

"Revolution CMM Models"; Advanced Industrial Measurement Systems; pp. 1-10; http://aimsmetrology.com/revolution-cmm-models/; webpage from Apr. 18, 2016; [retrieved Jan. 31, 2019].

Renishaw plc; "Equator 300 gaging system"; Renishaw datasheet H-5504-8200-01; www.renishaw.com; 2010.

Renishaw plc; "Equator versatile gauge with MODUS software"; Renishaw brochure H-5504-8200-07-A; www.renishaw.com; 2015.

Oct. 27, 2017 Search Report issued in European Patent Application No. 17275054.9.

Sep. 19, 2018 Extended Search Report issued in European Patent Application No. 18167645.3.

Oct. 6, 2017 Search Report issued in European Patent Application No. 17275053.1.

May 25, 2018 Search Report issued in European Patent Application No. 18167707.1.

Nov. 29, 2017 Search Report issued in European Patent Application No. 17275114.1.

May 25, 2018 Search Report and Written Opinion issued in International Patent Application No. PCT/GB2018/050996.

Ferranti 750B Machine—first known to the public before Apr. 19, 2017.

Brown & Sharpe Validator Chameleon Machine—first known to the public before Apr. 19, 2017.

Johansson Saphir CMM Machine—first known to the public before Apr. 19, 2017.

May 25, 2018 International Search Report issued in International Patent Application No. PCT/GB2018/050996.

May 25, 2018 Written Opinion issued in International Patent Application No. PCT/GB2018/050996.

Oct. 4, 2017 Search Report issued in European Patent Application No. 17275052.3.

* cited by examiner

LOAD BEARING STRUCTURE

This invention relates to a load bearing structure, such as a beam, for example for a positioning apparatus such as a coordinate measuring machine (CMM), (in particular a Cartesian coordinate positioning apparatus/CMM) and a method of manufacturing a such a load bearing box structure/beam.

A positioning apparatus, such as a CMM, can comprise one or more load bearing structures, such as a beam. Another member could be carried by the load bearing structure/beam. The other member could be relatively moveable with respect to the load bearing structure/beam. The other member could be a "carriage", and could itself carry another (relatively moveable) member. The load bearing structure, for example the beam, could itself be movable, e.g. relative to a part to be inspected/workpiece platform. For instance, bridge, portal and gantry type CMMs can comprise what is commonly referred to as a cross-beam which typically carries a carriage which is moveable along the cross-beam, e.g. along an x-axis. Typically, the cross-beam extends between at least two vertical legs. Depending on the machine type, one or more (or none) of the legs could be relatively moveable with respect to the machine bed (on which a part to be inspected is placed), e.g. along a y-axis. For example, the cross-beam could extend between two fixed raised rail members which the cross-beam can travel along. In another example, there might only be one fixed rail member on one side of the beam, and a leg provided on the other side of the beam which is fixed to and moves with the beam.

The aforementioned carriage can itself carry a quill (on which a tool, such as an inspection probe, can be carried) which can be moveable with respect to the carriage, e.g. along a z-axis. Such a CMM can be referred to as a 3-axis Cartesian CMM. A Cartesian coordinate positioning apparatus is one in which a tool mounted on the apparatus is moveable relative to a part to be inspected or worked on, by a movement system comprising three linear axes that are arranged in series, and arranged generally mutually perpendicular to each other (and generally designated as an x, y and z axis). Typical Cartesian coordinate positioning apparatus include Bridge, Portal, Cantilever, Horizontal Arm, and Gantry type machines.

As is also known, an articulated probe head, such as that described in U.S. Pat. No. 7,533,574, can be mounted on the end of the quill such that the tool can be rotated about one or more rotational axes. Such an arrangement is commonly known as a 5-axis system.

It is common for coordinate positioning apparatus, in particular Cartesian CMMs, to have a structure made from very stiff, heavyweight materials such as granite. Indeed, it is common for a significant proportion of a Cartesian CMM to be made from granite. For instance, it is quite normal for the workpiece platform (also known as a workpiece table), the moveable parts of the machine and the bearing surfaces for the moveable parts to be made primarily from granite, cast or extruded members.

The theory underlying the use of heavyweight materials and structures is that it is important that the CMM does not distort under a) the weight of a part to be measured that is located on the platform, and/or b) the moving weight of the various moveable parts of the CMM (for example, the bridge of a bridge-type CMM which moves back and forth along an axis, and which typically bears on the platform).

It is also generally desirable that the machine is stable in the event of environmental temperature changes. Accordingly, structures made from high-density materials which have a large thermal inertia (e.g. granite) have traditionally been used when making CMMs in order to achieve such stability.

Furthermore, it is quite common for the bearings between the moveable parts are air bearings, thereby providing friction free relative motion. In order to function well air bearings need to run on very flat, precisely formed bearing surfaces that do not distort under the weight of the part that bears against it. The use of air bearings therefore tends to lead to the use of a rigid, relatively heavyweight material such as granite, or thickly cast or extruded members, as the bearing surface, thereby increasing the weight and cost of the machine.

Several attempts have been made to produce lighter-weight CMMs, and/or CMMs which utilise mechanical bearings as opposed to air bearings. For example U.S. Pat. No. 5,402,981, EP1500903, EP2089592, U.S. Pat. Nos. 6,202,316, 5,125,163, 5,173,613, EP0268659, U.S. Pat. Nos. 5,388,343, 5,063,683, WO89/09887 and U.S. Pat. No. 8,739,420 describe various example machines which are designed to reduce/avoid the use of granite and other heavyweight materials.

The present invention concerns improvements in lightweight measuring machines. For example, the present invention concerns particular design considerations for lightweight measuring machines which offer advancements over the known so-called lightweight measuring machines such as those described in the references mentioned above.

The present invention relates to a measuring machine, at least a part of the structure of which (hereinafter called a member) is made from sheet material (for example sheet metal). For example, at least one load bearing structure (e.g. which forms part of the metrology loop) can be formed from sheet material. In particular, at least one structure on which a bearing part is provided can itself be formed from sheet material. For example, at least a movable member of the measuring machine is (predominantly) made from sheet material.

In particular, the present invention relates to an improved load bearing structure for use in a positioning apparatus, such as a CMM, and improved methods of manufacturing such a load bearing structure.

For example, this application describes a load bearing structure such as a beam (e.g. a moveable beam) for a coordinate positioning apparatus. The load bearing structure (e.g. the beam) comprises at least one elongate bearing track member providing one or more bearing surfaces (e.g. air bearing surfaces) for a carriage moveable along the load bearing structure, and at least one piece of sheet material arranged to provide at least one load bearing facet. The load bearing structure (e.g. beam) can be a moveable load bearing structure, e.g. it can comprise one or more bearing parts (e.g. air bearing pads) for cooperating with one or more bearing parts (e.g. elongate air bearing surfaces) on another member of the coordinate positioning apparatus so as to facilitate movement of the load bearing structure.

According to a first aspect of the invention there is provided a coordinate positioning apparatus comprising a load bearing structure, the load bearing structure comprising at least one elongate corner piece (e.g. an elongate bearing track member forming a corner of the load bearing structure) providing at least two bearing surfaces, one on each side of the corner, for a carriage moveable along the load bearing structure, and at least one piece of sheet material which extends along the at least one elongate corner piece. The at least one piece of sheet material can provide at least one load bearing facet.

It has been found that a load bearing structure according to the modular design of the present invention enables a load bearing structure of significant expanse and rigidity to be achieved, whilst minimising weight. In particular, a load bearing structure which has a modular configuration according to the invention (e.g. sheet material combined with separate corner pieces arranged to provide bearing surfaces on either side of their respective corners) can provide for a lightweight, yet stiff load bearing structure. In particular, the sheet material can provide significant weight savings over cast or extruded components, whilst separate bearing track members can provide the necessary stiffness required for the carriage's bearing members. For example, owing to the combination of the elongate bearing members forming the corners of the load bearing box structure and the sheet material load bearing facets, a beam according to the present invention can be relatively lower in mass (and hence lighter in weight) than a beam of comparable dimensions made using the techniques described in EP2089592 which relies on the main beam structure being made from a plurality of extruded identical sub-beams.

Minimising the use of heavyweight materials and making a CMM as lightweight as possible can provide several benefits. For example, it can reduce the amount of material needed and hence wasted. A lightweight CMM can be run more efficiently and cheaply by a user since less energy is needed to operate the CMM. Further still, the moveable members of a lightweight CMM have low inertia, thereby reducing bending caused by inertia during acceleration; this can lead to better measurement throughput.

The load bearing structure can be a load bearing box structure. The load bearing structure can be a beam. For example, the load bearing structure can comprise a box beam. The beam (e.g. the box beam) could be a moveable beam (e.g. moveable in a first dimension, for example a first linear dimension). The beam (e.g. the box beam) could be a cross-beam, e.g. a horizontal cross-beam.

As will be understood, a facet can be flat. A fact could be internal to the load bearing structure, or could form part of its outer surface/shell. The at least one sheet and at least one bearing track member could together provide a (e.g. substantially) monocoque or semi-monocoque structure.

The load bearing structure can comprise at least one piece of sheet material arranged to provide at least one load bearing facet on each side/end of the corner piece. This could be provided by one sheet of material which is folded such that it provides said load bearing facet on each side. Accordingly, at least one of the pieces of sheet material can be folded so as to provide at least two (e.g. external/outer) facets of the load bearing structure. Optionally, each load bearing facet on each side/end of the corner piece is provided by separate/different sheets of material.

Optionally, the at least one piece of sheet material is not more than 5 mm thick, for example not more than 3 mm thick, optionally not more than 1 mm thick, for example not more than 0.5 mm thick. Optionally, the sheet material comprises a metallic material (e.g. aluminium, or stainless steel).

Appropriate approximate cross-sectional shapes of the load bearing structure include, rectangular, square, triangular, pentagonal, and other regular or irregular multi-sided shapes.

Optionally, the bearing surfaces (provided by the elongate corner piece) sit proud of the at least one piece of sheet material (i.e. sit proud of the surface of the at least one piece of sheet material adjacent the bearing surface). In other words, optionally, the bearing surfaces (provided by the elongate corner piece) are substantially not flush with the at least one piece of sheet material. For example, there can a substantial step between the surface of the at least one piece of sheet material and the adjacent bearing surface. For example, a step of at least 5 mm, optionally at least 10 mm, for example at least 15 mm, for instance 18 mm or more.

The thickness of the at least one elongate bearing track member can be at least 2 times thicker than that of at least one of the pieces of sheet material, for example at least 3 times.

The at least one elongate corner piece can be an extruded member (e.g. extruded metal, e.g. aluminium or stainless steel). The at least one elongate corner piece can be hollow in cross-section. When hollow, one or more reinforcing webs can be provided. Optionally, at least one web is arranged that extends perpendicular to the plane of the bearing surface. Optionally, said at least one web is arranged so as to be located approximately centrally with respect to where a bearing member (e.g. air bearing pad) will (does) rest. Accordingly, this can help to ensure that the pre-load forces are carried substantially through/in/along the (e.g. shear) plane of the web.

The load bearing structure can comprise at least two elongate corner pieces. Each elongate bearing track member can provide at least one bearing surfaces, and optionally at least two bearing surfaces (with one on either side of their respective corners).

The at least two elongate corner pieces can be configured to have substantially the same thermal inertia. For example, this could be achieved by them being substantially identical in form and material.

The load bearing structure can comprise at least one further elongate corner piece (e.g. a third elongate member). The at least one further elongate corner piece (e.g. the third elongate member) can have substantially the same thermal inertia as the other aforementioned elongate corner piece(s) (that provide at least one bearing surface).

The load bearing structure could comprise two elongate corner pieces (which each provide at least one bearing surface, optionally two bearing surfaces, one on either side of the bearing track members), respectively forming first and second corner pieces of the load bearing structure. The load bearing structure could comprise a further elongate corner piece forming a third corner of the load bearing structure. The load bearing structure could further comprise first, second and third pieces of sheet material, respectively extending along and between first, second and third pairs of the corner pieces so as to provide load bearing facets therebetween.

The load bearing structure could comprise at least one (e.g. sheet material) bulkhead (or "rib"). Such bulkhead(s) can help resist torsion of the box structure about its longitudinal axis. The load bearing structure could comprise at least one bulkhead located at each of its end. Such "end" bulkheads could be thicker than any "inner bulkheads". For example, the thickness of the end bulkheads could be at least 5 mm (e.g. at least 6 mm), and the thickness of the inner bulkheads could be not more than 5 mm (e.g. not more than 4 mm, for instance not more than 3 mm).

The at least one bulkhead could be solid, or hollow (e.g. have one or more holes extending through it).

The at least one (e.g. sheet material) bulkhead can be arranged end-on to the at least one piece of sheet material, e.g. such that forces applied normal to the at least one piece of sheet material are transferred directly into/along the (e.g. shear) plane of the at least one (e.g. sheet material) bulkhead. Accordingly, the edge of the at least one (e.g. sheet material) bulkhead can comprises one or more pop/blind rivet receiving areas such that the bulkhead can be pop/blind riveted to the at least one piece of sheet material which extends along the at least one elongate corner piece.

The at least one elongate corner piece and at least one piece of sheet material could be glued together (e.g. via adhesive). Alternatively, they could be welded together. In embodiments in which a bulkhead is provided, the bulkhead could be secured to the at least one piece of sheet material via at least one mechanical fastener, e.g. at least one rivet. Additionally/alternatively, the bulkhead could be glued (or alternatively welded) to the at least one piece of sheet material.

The coordinate positioning apparatus can comprise a carriage moveable along the load bearing structure (e.g. in a second dimension, e.g. perpendicular to the aforementioned first dimension). The carriage can comprise bearing members which bear against the bearing surfaces of the at least one elongate bearing track member. The bearing members can comprise air bearings (e.g. one or more air bearing pads). The carriage can carry at least one further member moveable relative to the carriage, (e.g. in a third dimension, e.g. perpendicular to the aforementioned first and/or second dimensions). The at least one further member could be what is commonly referred to in the field of CMMs as a quill or spindle.

As will be understood, the coordinate positioning apparatus can be configured to carry a tool for interacting with an artefact, for example an inspection device. For example, the carriage or a further member (e.g. a quill) could be configured to carry the tool. The tool could comprise a measurement device, for example a measurement probe. The inspection device could comprise a contact or non-contact inspection device. For example, the inspection device could comprise a scanning probe (also known as an analogue probe). The tool could be mounted to the coordinate positioning apparatus via an articulated head. The articulated head could be configured to provide rotation of a tool mounted thereon about at least one axis, for example about at least two axes (e.g. at least two orthogonal axes). The articulated head could be a scanning head (as opposed to an indexing head).

The positioning apparatus could comprise a coordinate measuring machine (CMM), for example a Cartesian CMM.

As will be understood, features described above in connection with the first aspect of the invention are equally applicable to the below described subsequent aspects, and vice versa.

According to a second aspect of the invention there is provided a coordinate positioning apparatus comprising a platform on which an artefact can be placed and a movement system for carrying and effecting relative movement of a tool relative to the platform. The movement system can comprise a first body comprising at least one bearing surface, and a second body comprising at least one bearing member which interacts with said at least one bearing surface so as to facilitate relative movement of the first and second bodies. The first and second bodies could be pre-loaded together. The pre-load could be carried through the at least one first bearing member and said one or more bearing surfaces. The first body can comprise at least one elongate bearing track member providing the at least one bearing surface, and at least one piece of sheet material arranged to provide at least one load bearing facet which extends along the elongate bearing track. The coordinate positioning apparatus could be configured such that the resultant force imparted into the at least one elongate bearing track member by the at least one bearing member of the second body due to the pre-load is primarily carried by, e.g. along the (shear) plane of, said at least one piece of sheet material.

The coordinate positioning apparatus could be configured such that the resultant force imparted into the at least one elongate bearing track member by the at least one bearing member of the second body due to the pre-load is resolvable directly into and along the (e.g. shear) plane of said at least one piece of sheet material. The first body could comprise at least one piece of sheet material arranged to provide at least two load bearing facets which extends along the elongate bearing track.

The coordinate positioning apparatus could be configured such that the at least two load bearing facets which extend along the elongate bearing track, bear between them the majority of the resultant force imparted into the at least one elongate bearing track member by the at least one bearing member of the second body due to the pre-load into the at least one elongate bearing track member.

The coordinate positioning apparatus could be configured such that along the length of the elongate bearing track, the force due to the pre-load imparted into the at least one elongate bearing track member by the at least one bearing member of the second body, at a point of cooperation between the two, is directed so as to intersect a (e.g. predetermined) elongate target line that extends parallel to the elongate bearing track.

There can be at least two points of cooperation between said at least one bearing member and elongate bearing track. Forces imparted onto the elongate bearing track by the at least one bearing member at said at least two points of cooperation can be configured to intersect said elongate target line.

The at least one bearing member can straddle said elongate bearing track, e.g. so as to provide at least two laterally displaced points of cooperation. (For example, the at least one bearing member could comprise two, laterally displaced, air bearing pads). As will be understood, the at least two laterally displaced points of cooperation can be displaced perpendicularly to the length of the elongate guide rail. Optionally, the at least two laterally displaced points of cooperation can be contained in a plane perpendicular to the guide rail (e.g. so as to avoid shear).

The elongate target line can be located in the vicinity of a notional elongate volume defined by the intersection of a first pair of planes containing the front and back surfaces of the material defining a first load bearing facet and with a second pair of planes containing the front and back surfaces of the material defining a second load bearing facet. Accordingly, in other words, the apparatus could be configured such that the forces imparted into said elongate bearing track at said at least two laterally spaced points of cooperation can be configured to intersect each other in the vicinity of said notional elongate volume. In the vicinity of can mean being located within a greater notional volume which is centred on the notional elongate volume, and having a cross-sectional extent that is greater than that of the notional elongate volume by not more than 5 mm on all sides, optionally not more than 3 mm, for example not more than 2 mm for instance not more than 1 mm.

The at least one bearing member can comprise an air bearing.

Optionally, the thickness of the at least one piece of sheet material is not more than 5 mm, optionally not more than 4 mm, optionally not more than 3 mm, optionally not more than 2 mm, optionally not more than 1 mm, for example not more than 0.5 mm.

As will be understood, details described above in connection with this first aspect of the invention are equally applicable to the other below described aspects of the invention, and vice versa.

According to another aspect of the invention there is provided a coordinate positioning apparatus comprising a beam and a carriage supported by and moveable along the beam. The beam can comprise at least one elongate bearing track member and at least one piece of sheet material which together provide a substantially monocoque structure. As will be understood, the beam and carriage can be pre-loaded against each other, and the substantially monocoque structure can primarily carry the pre-load forces. In other words, the pre-load forces could be carried primarily through an outer skin of the beam. In particular, for example, the elongate bearing track member and the at least one piece of sheet material can define a structural outer skin though which the pre-load is predominately carried. Such a structure could also be referred to as a semi-monocoque structure.

The beam could comprise at least one bulkhead, e.g. for providing additional support against any torsional loads about the beam's longitudinal axis.

According to another aspect of the invention there is provided a method of manufacturing a load bearing structure (e.g. a beam) for a coordinate positioning apparatus comprising bearing surfaces for a carriage moveable along the beam, the beam comprising a modular structure of at least one elongate corner members/piece and at least one piece of sheet material which extends along the at least one elongate corner member and provides at least one load bearing facet. The method can comprise assembling the at least one corner member/piece and at least one piece of sheet material to provide the load bearing structure. The method can further comprise subsequently machining the elongate corner member/piece to provide a smooth, flat bearing surface. The corner member/piece could be an extruded corner member/piece.

Assembling the at least one corner member and at least one piece of sheet material could comprise using an adhesive to glue the at least one corner member and at least one piece of sheet material together.

The load bearing structure could comprise at least one (e.g. sheet material) bulkhead. The load bearing structure could be mounted into a machine tool via at least one of its bulkheads (e.g. via bulkhead located at at least one of its ends). Accordingly, the bulkhead could comprise one or more feature (e.g. holes) for mounting the bulkhead into a machine tool. The at least one bulkhead could be riveted to the at least one piece of sheet material. The at least one bulkhead could be glued to the at least one piece of sheet material.

Accordingly, this application describes a load bearing box structure, e.g. a box beam, for a coordinate positioning apparatus. The load bearing box structure, e.g. the beam, can comprise at least one elongate bearing track member providing one or more bearing surfaces (e.g. air bearing surfaces) for a carriage moveable along the beam, and at least one piece of sheet material arranged to provide at least one load bearing facet (configured to form the load bearing structure of the box beam).

In particular, this application describes a load bearing structure, e.g. a beam, for a coordinate positioning apparatus. The load bearing structure can comprise at least one elongate bearing track member. The elongate bearing track member can form a corner of the load bearing box structure. The elongate bearing track member can provide at least two bearing surfaces (e.g. air bearing surfaces), one on each side of the corner for a carriage moveable along the load bearing structure. The load bearing structure can comprise at least one piece of sheet material which extends along the at least one elongate bearing track member and provides at least one load bearing facet (configured to form the load bearing structure of the beam).

Embodiments of the invention will now be described, by way of example only, with reference to the following drawings in which.

Figure 3:
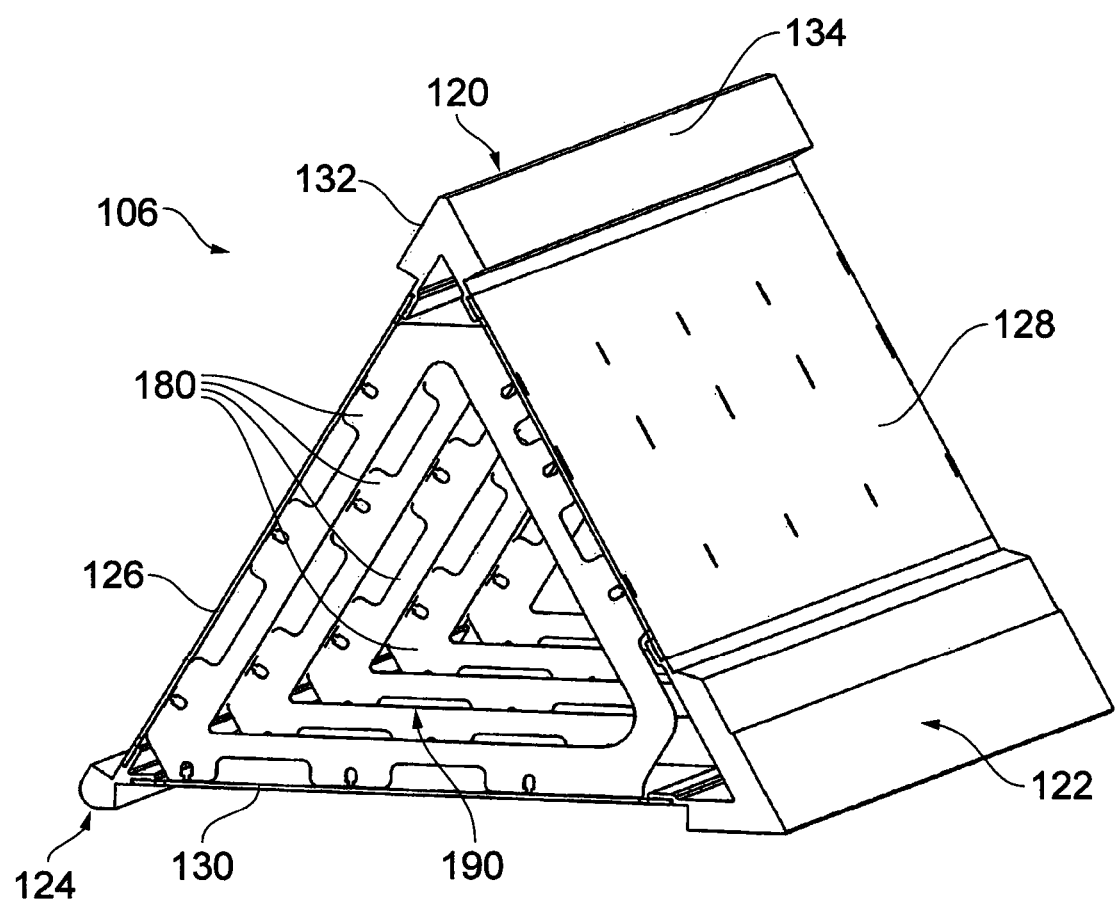
FIG. 3 is a schematic isometric view of the cross-beam of the CMM of FIG. 1.
Figure 6:
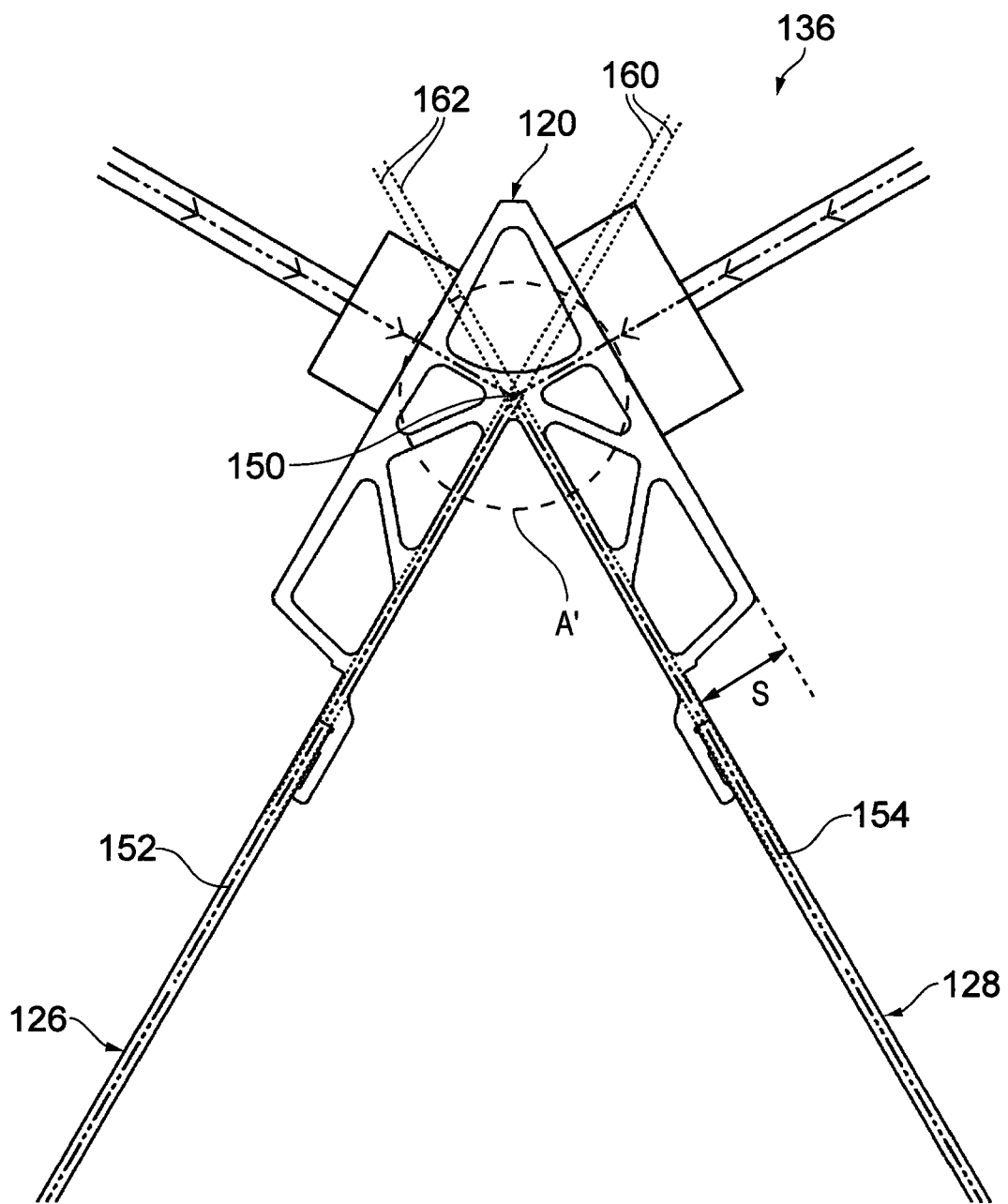
Figure 7A:
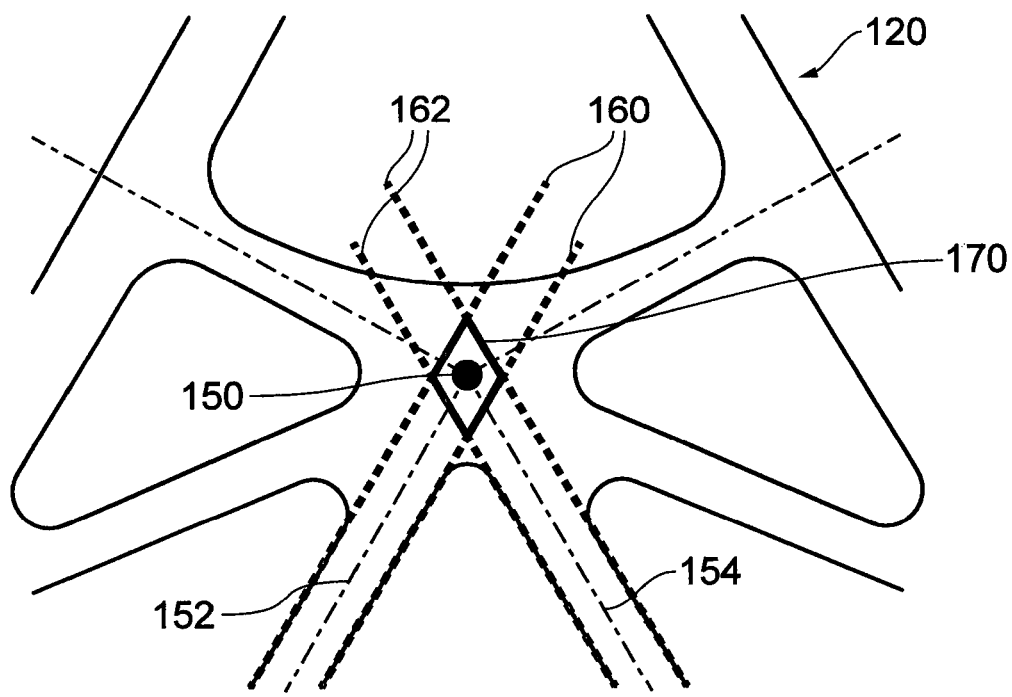
Figure 7B:
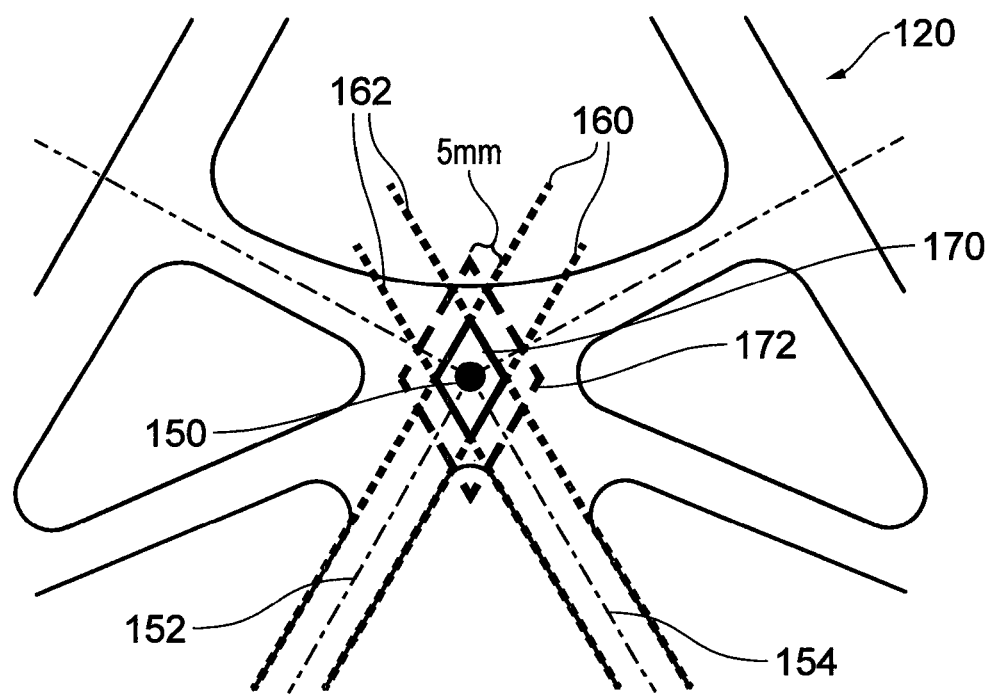
Figure 8:
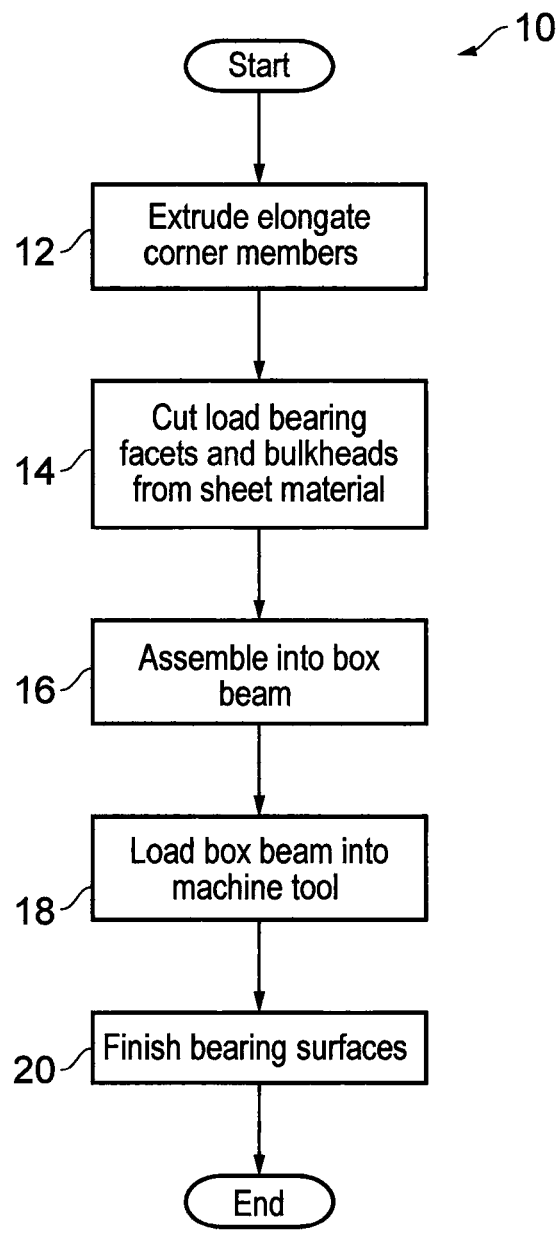
Figure 9:
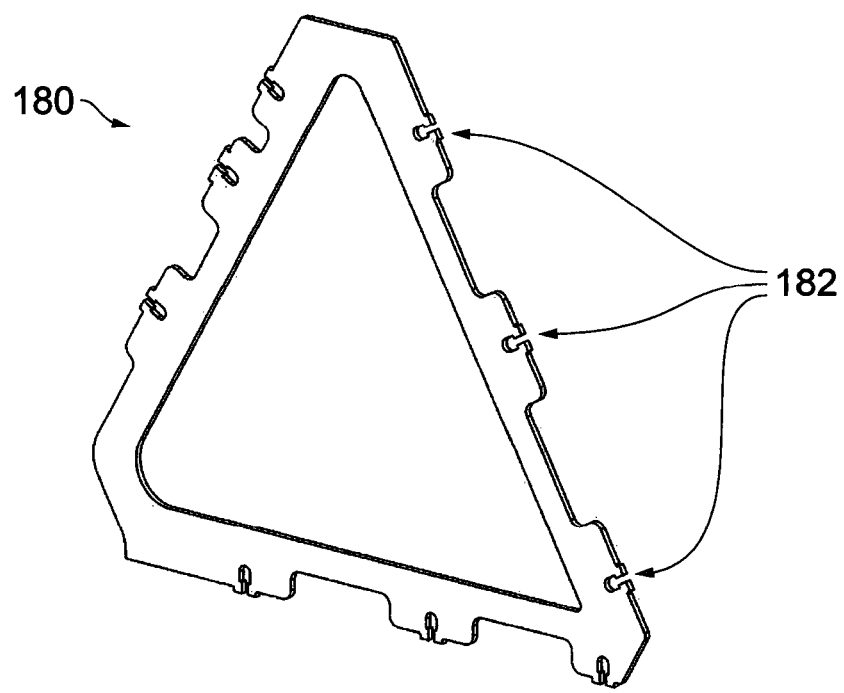
Figure 10:
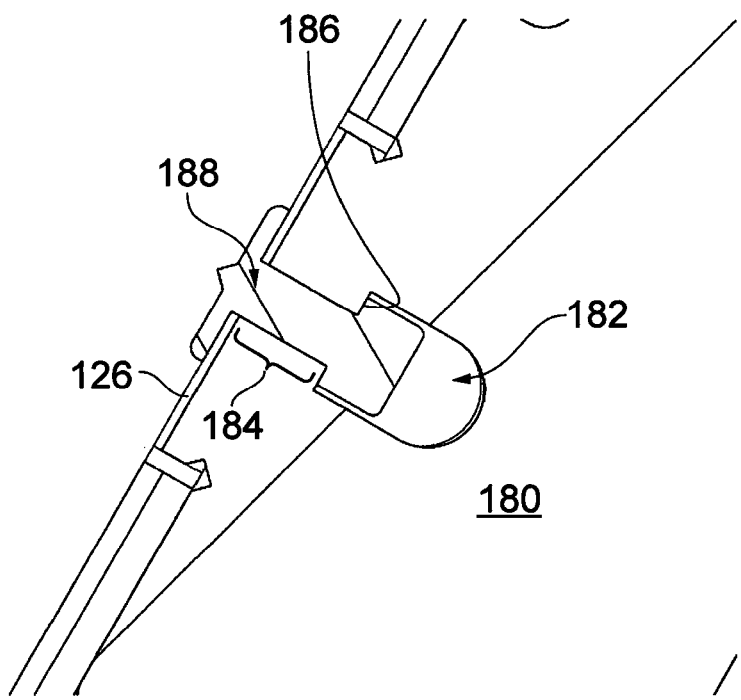
Figure 11A:
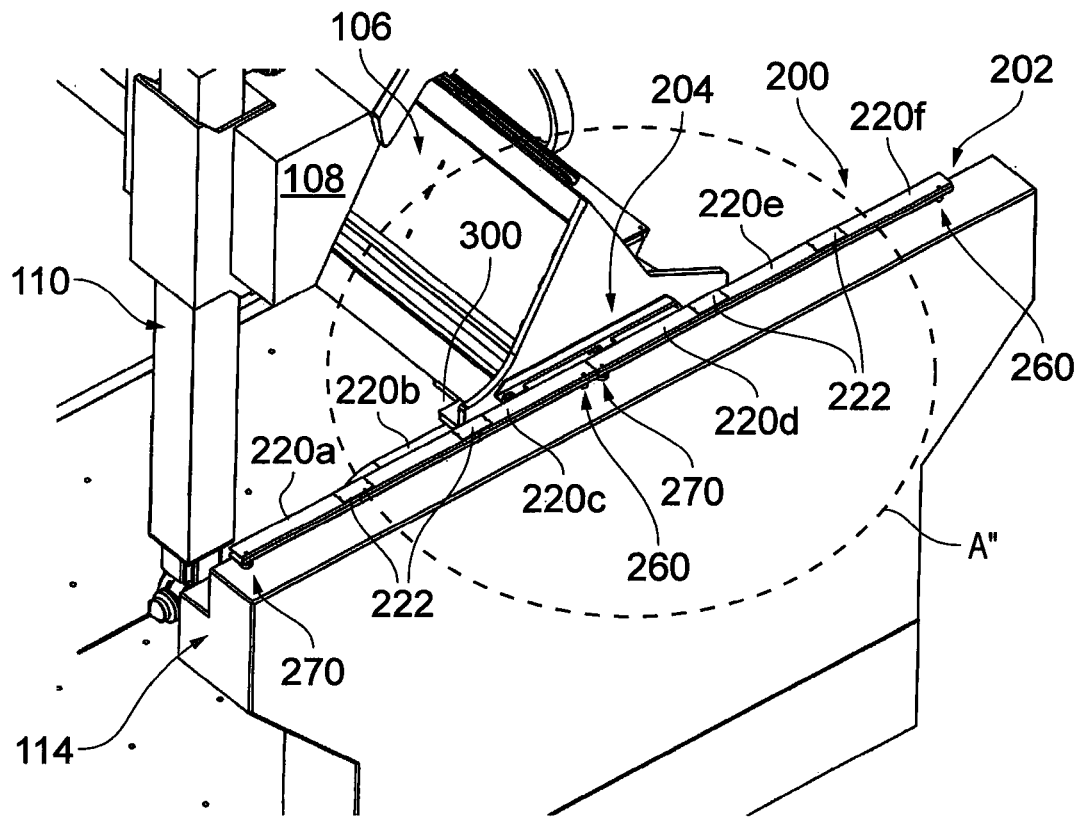
Figure 11B:
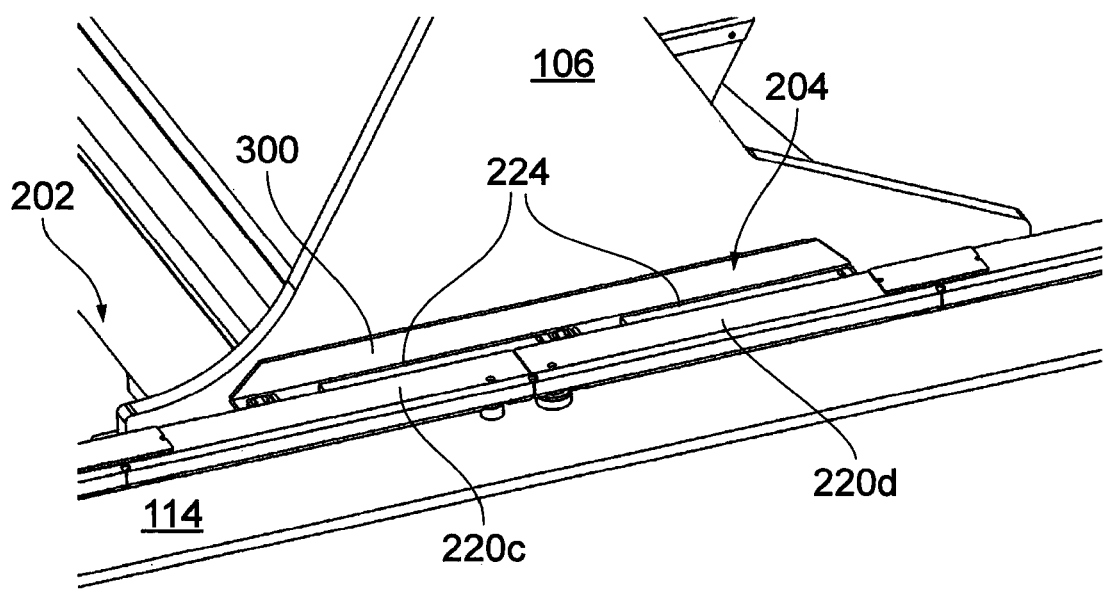
Figure 12A:
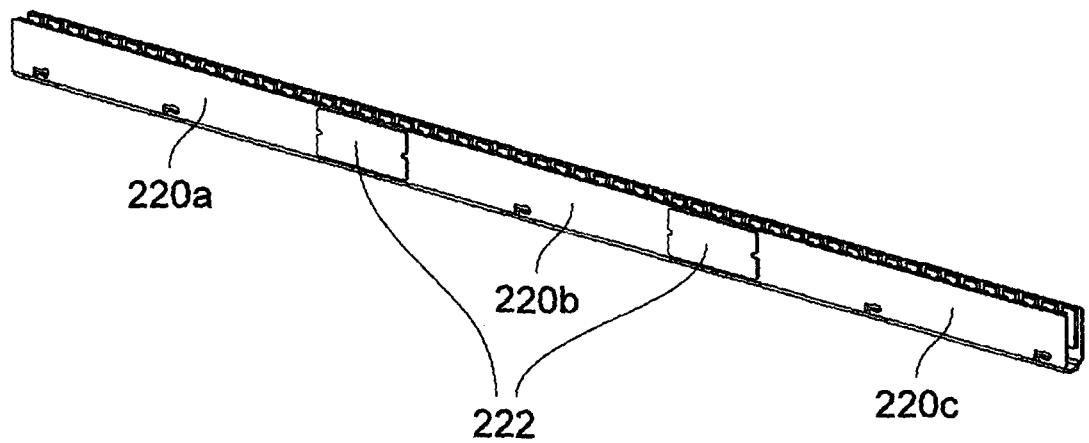
Figure 12B:
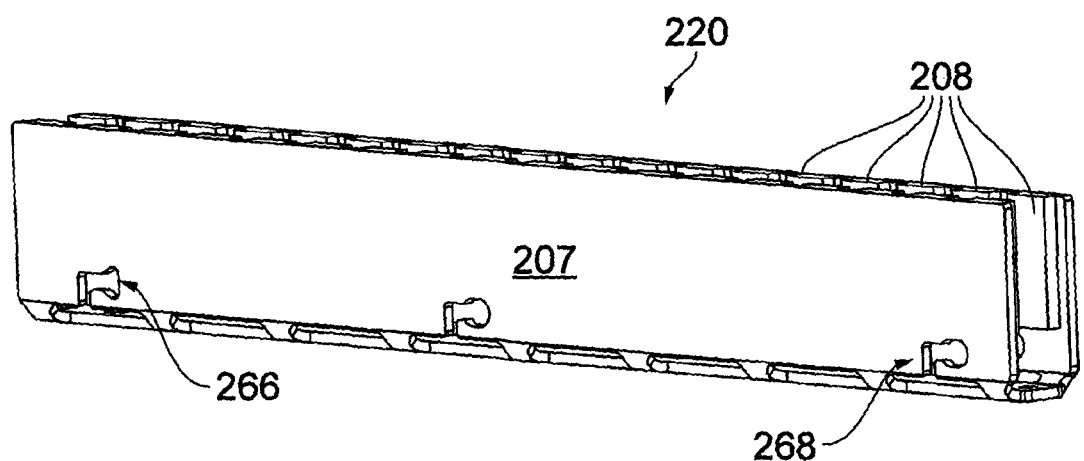
Figure 13:
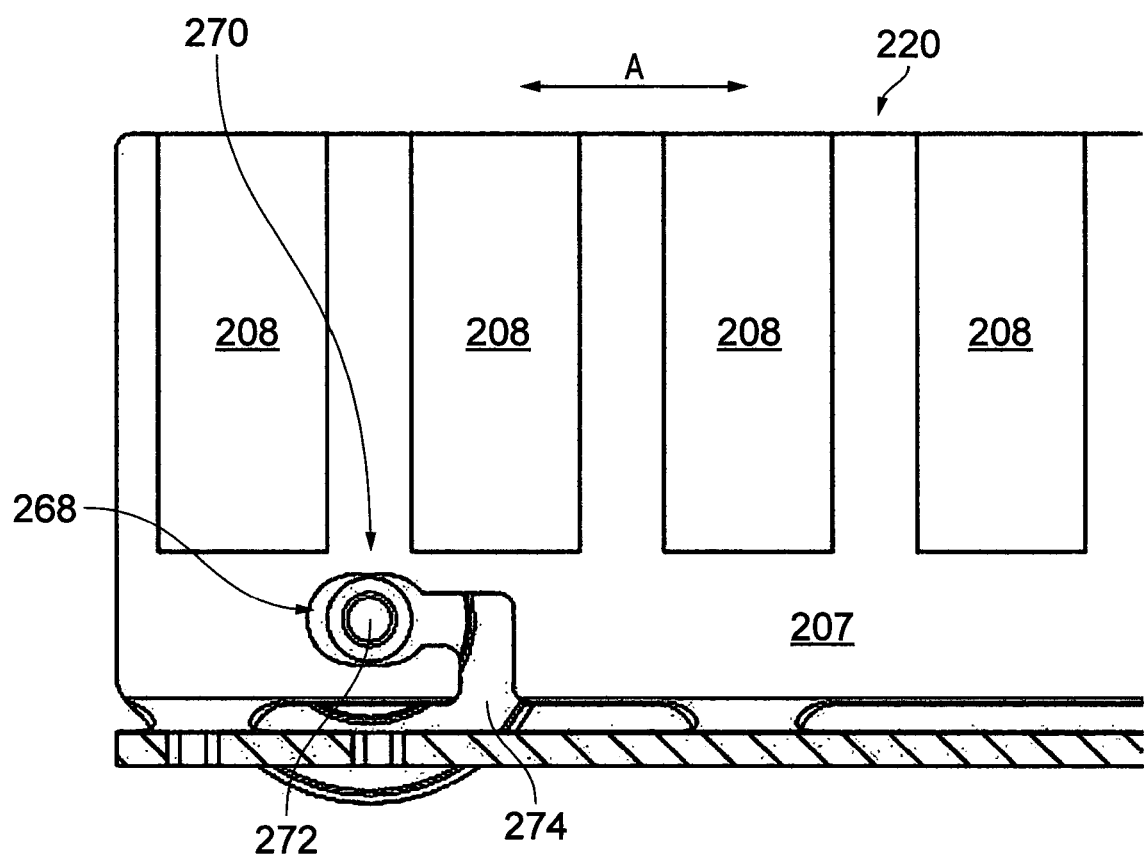
Figure 14:
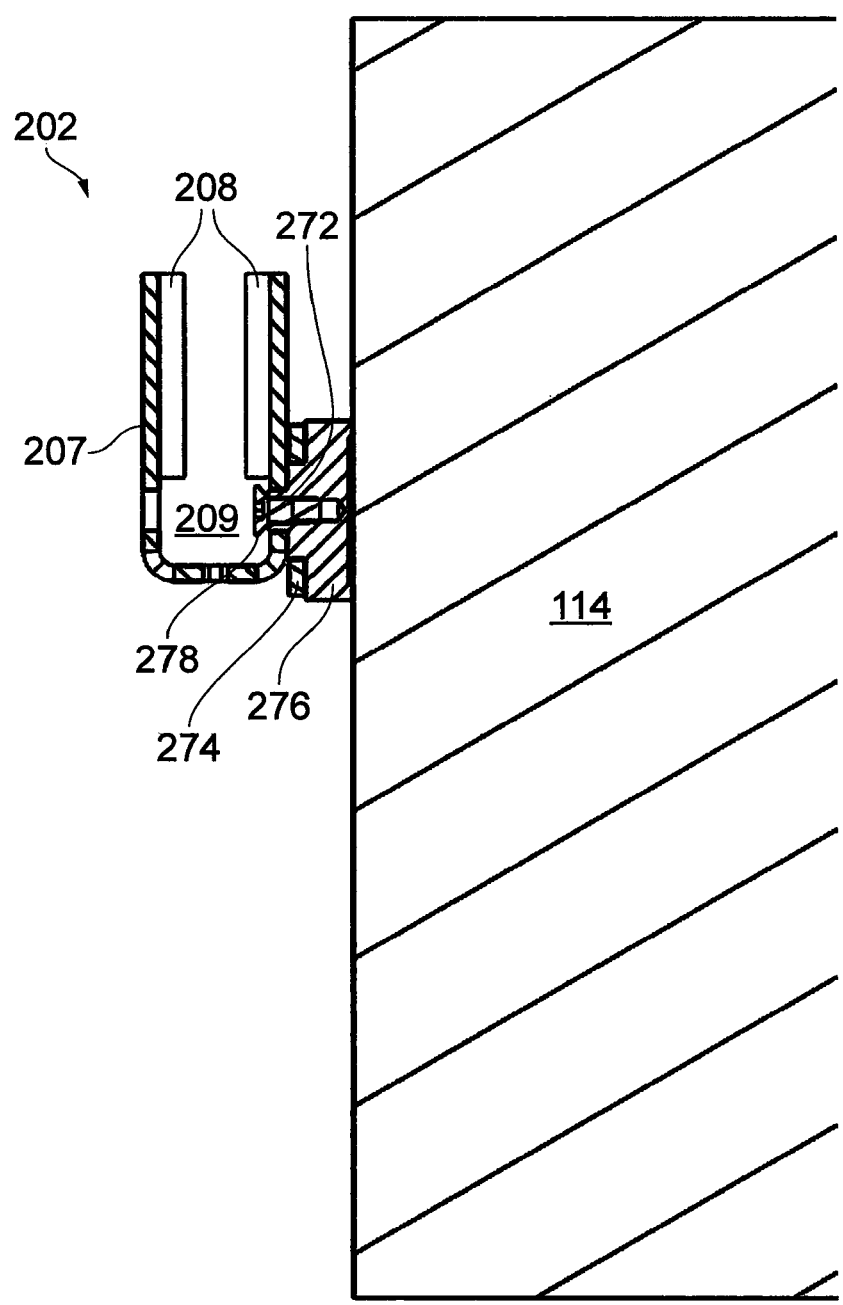
Figure 15:
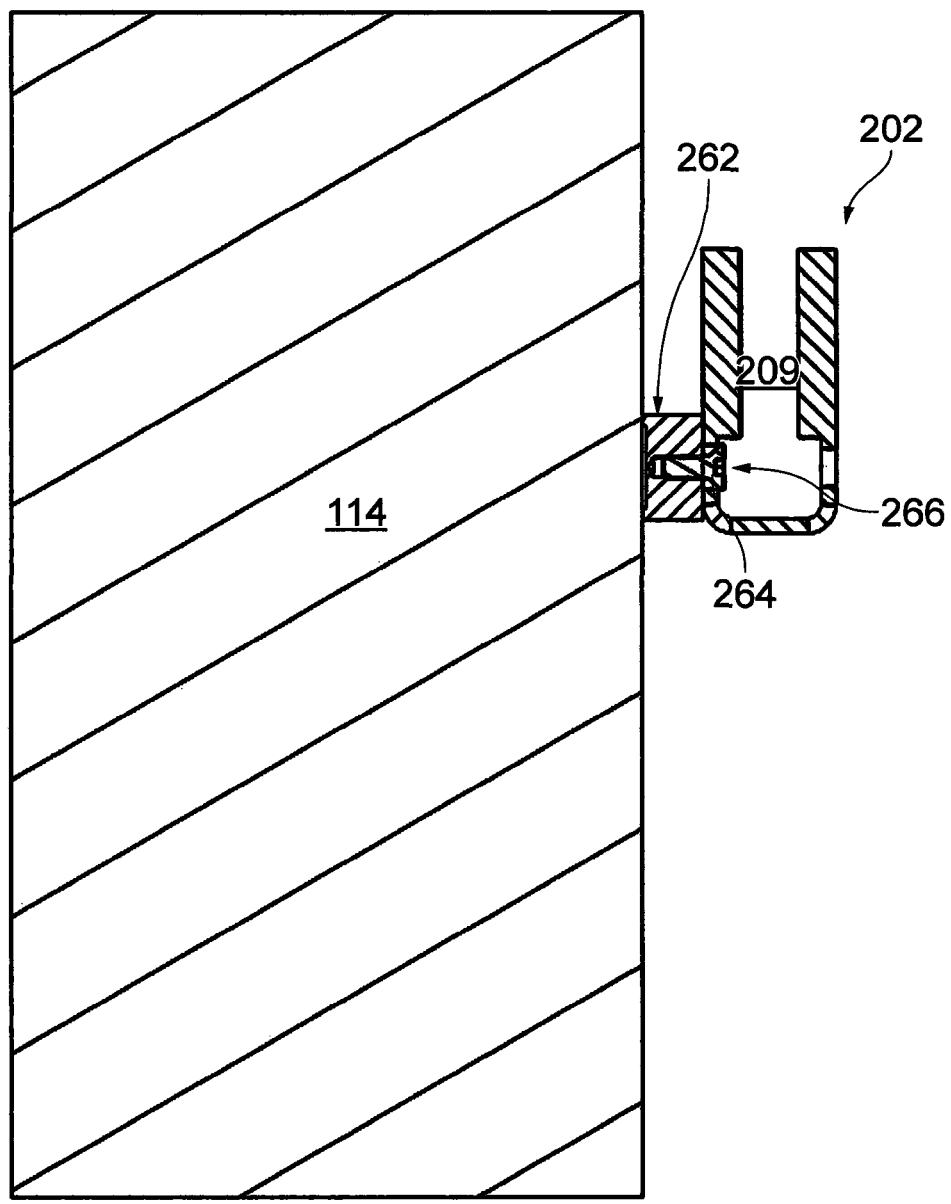
Figure 16:
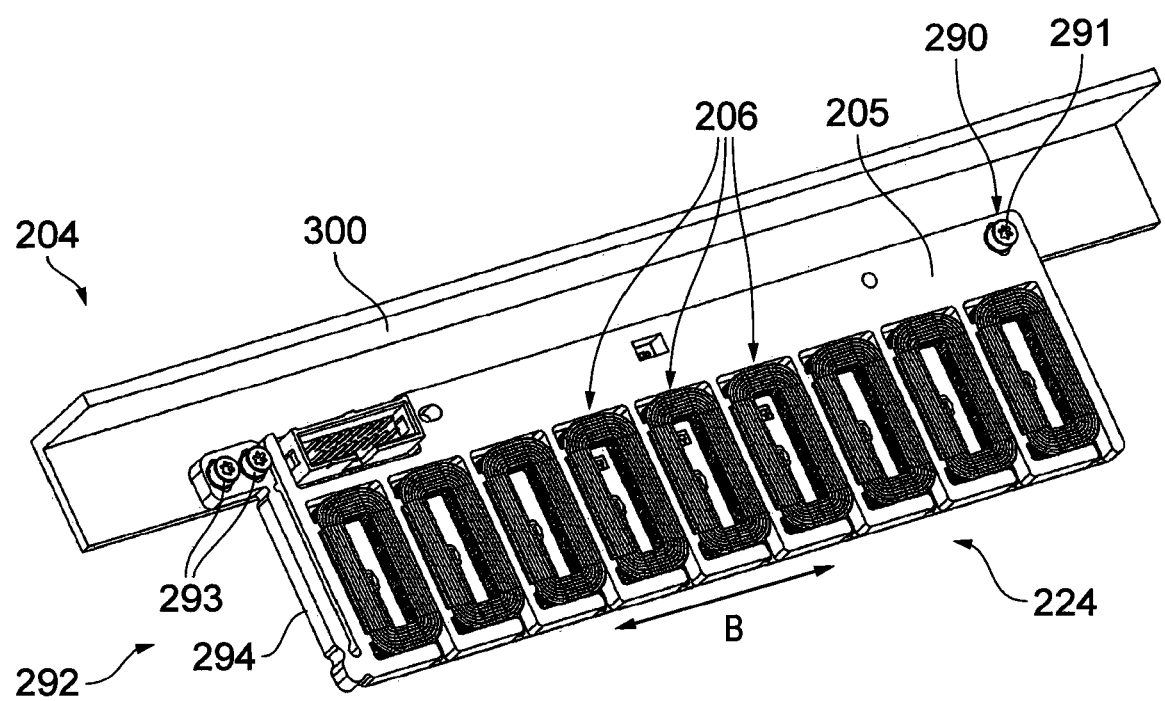

FIGS. 7*a* and 7*b* are detail views of the area A' identified in FIG. 6;

FIG. 8 is a flow chart illustrating an example method of manufacturing the cross-beam of FIG. 3;

FIG. 9 shows a bulkhead in isolation;

FIG. 10 is a cross-sectional view showing how the load bearing facets of the box structure of the cross-beam of FIG. 3 is riveted to the bulkheads;

FIGS. 11*a* and 11*b* show the linear motor arrangement for the CMM's y-axis, with FIG. 11*b* being a detail view of the area A" identified in FIG. 11*a*;

FIG. 12*a* shows a stator assembly of the linear motor of FIG. 11 in isolation;

FIG. 12*b* shows a module of the stator assembly of FIG. 12*a* in isolation;

FIGS. 13 and 14 shows the compliant mount assembly of the stator assembly of FIG. 12 in plan and cross-sectional view respectively;

FIG. 15 shows the fixed mount assembly of the stator assembly of FIG. 12 in cross-sectional view; and FIG. 16 shows an isometric view of an armature assembly of the linear motor of FIG. 3.

Figure 1:
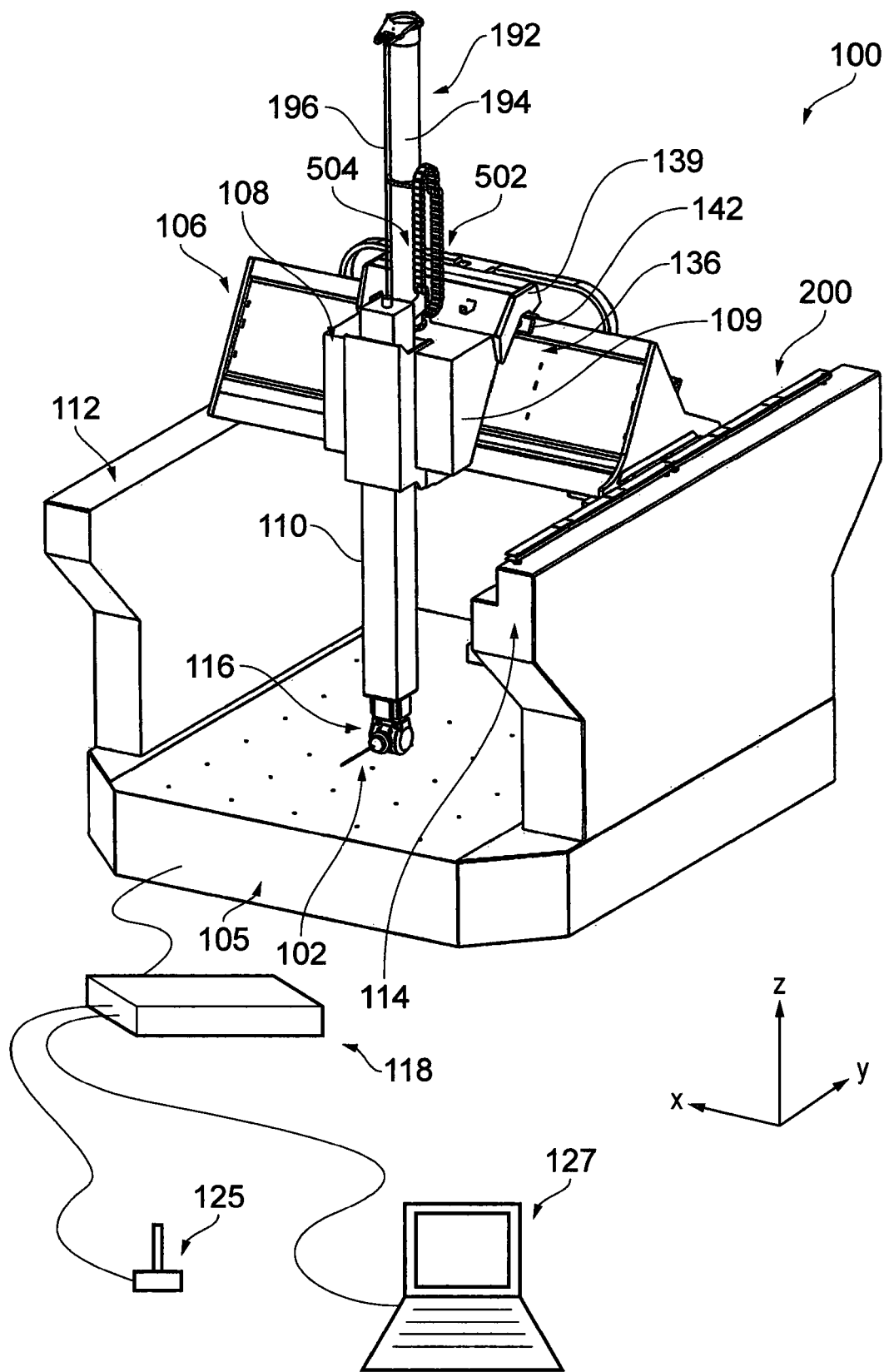
FIG. 1 is a schematic isometric view of the front of a gantry-type CMM according to the present invention.
Figure 2:
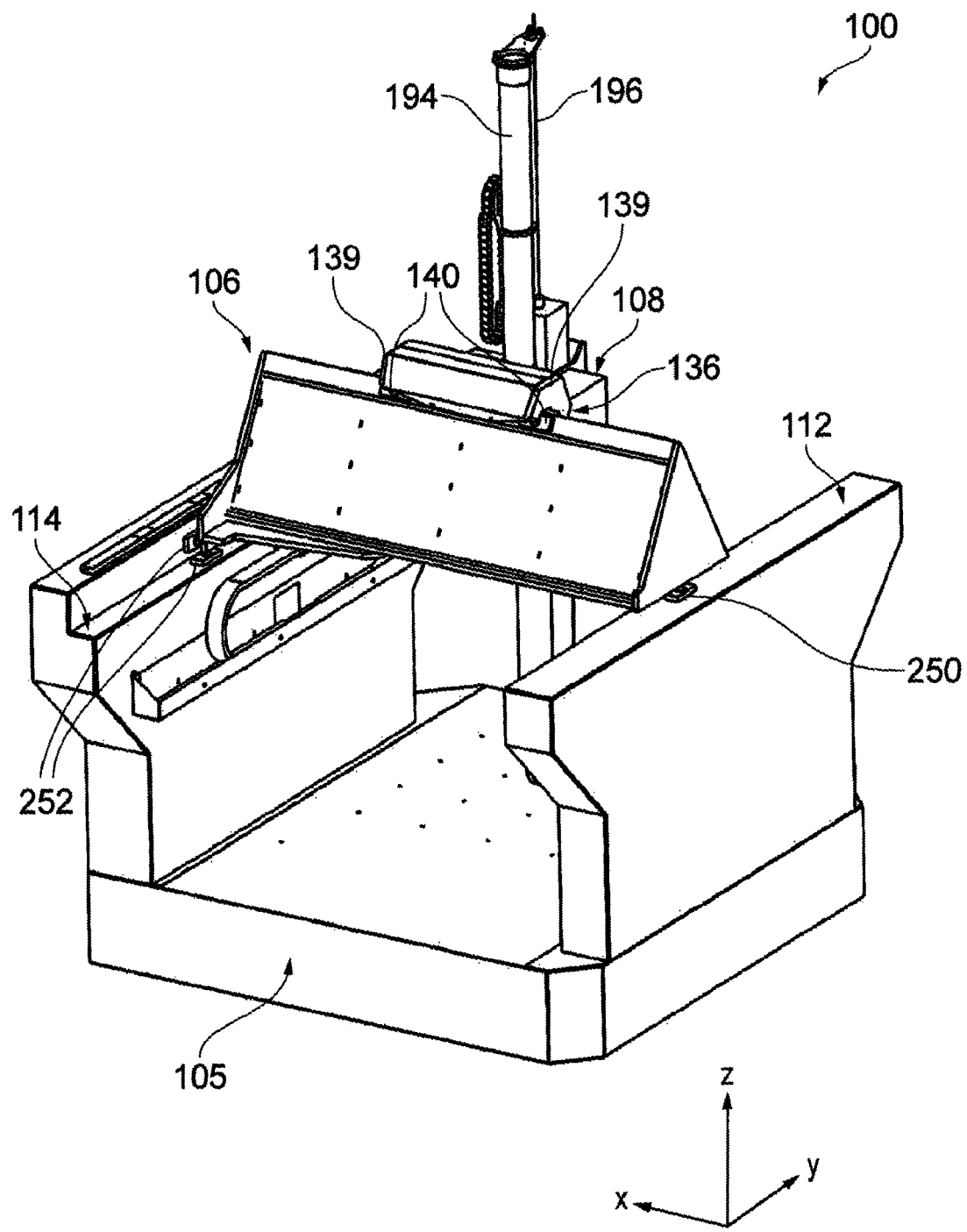
FIG. 2 is a schematic isometric view of the rear of the CMM of FIG. 1.
Figure 17:
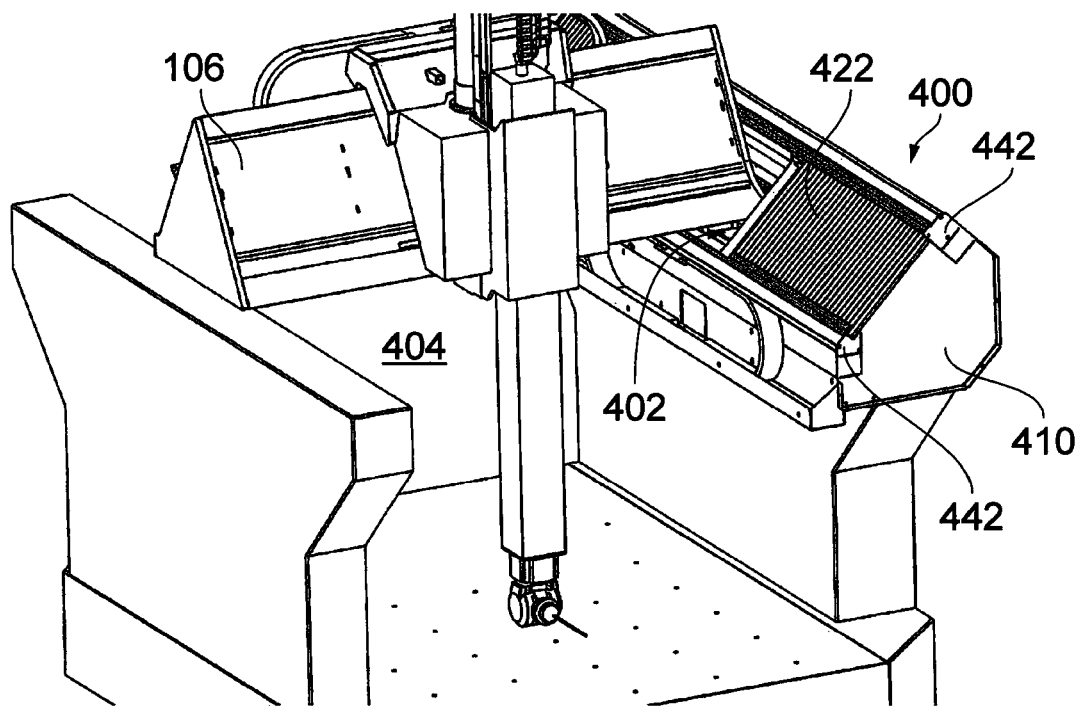
Figure 18:
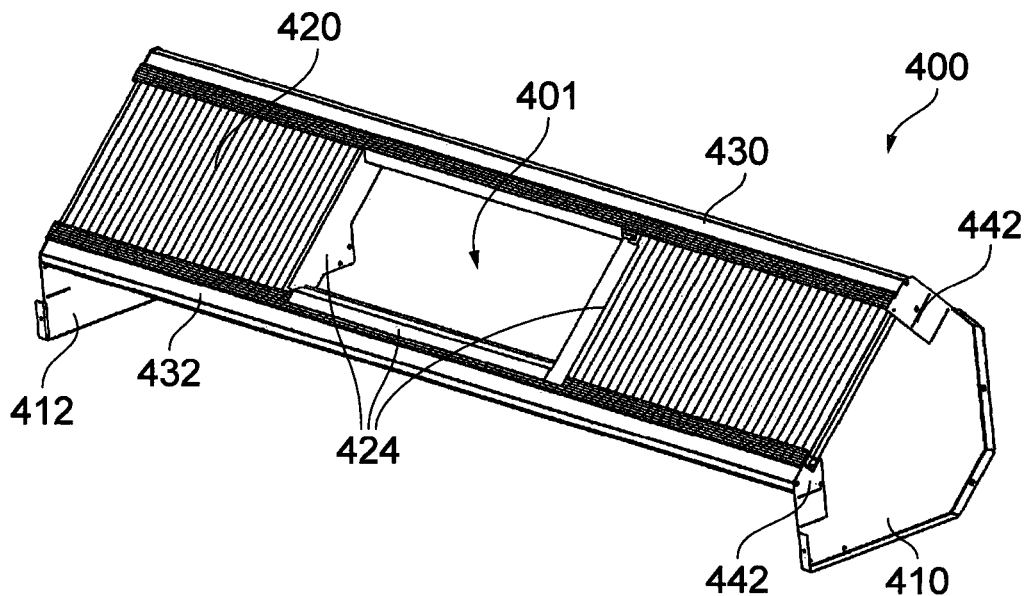
Figure 19:
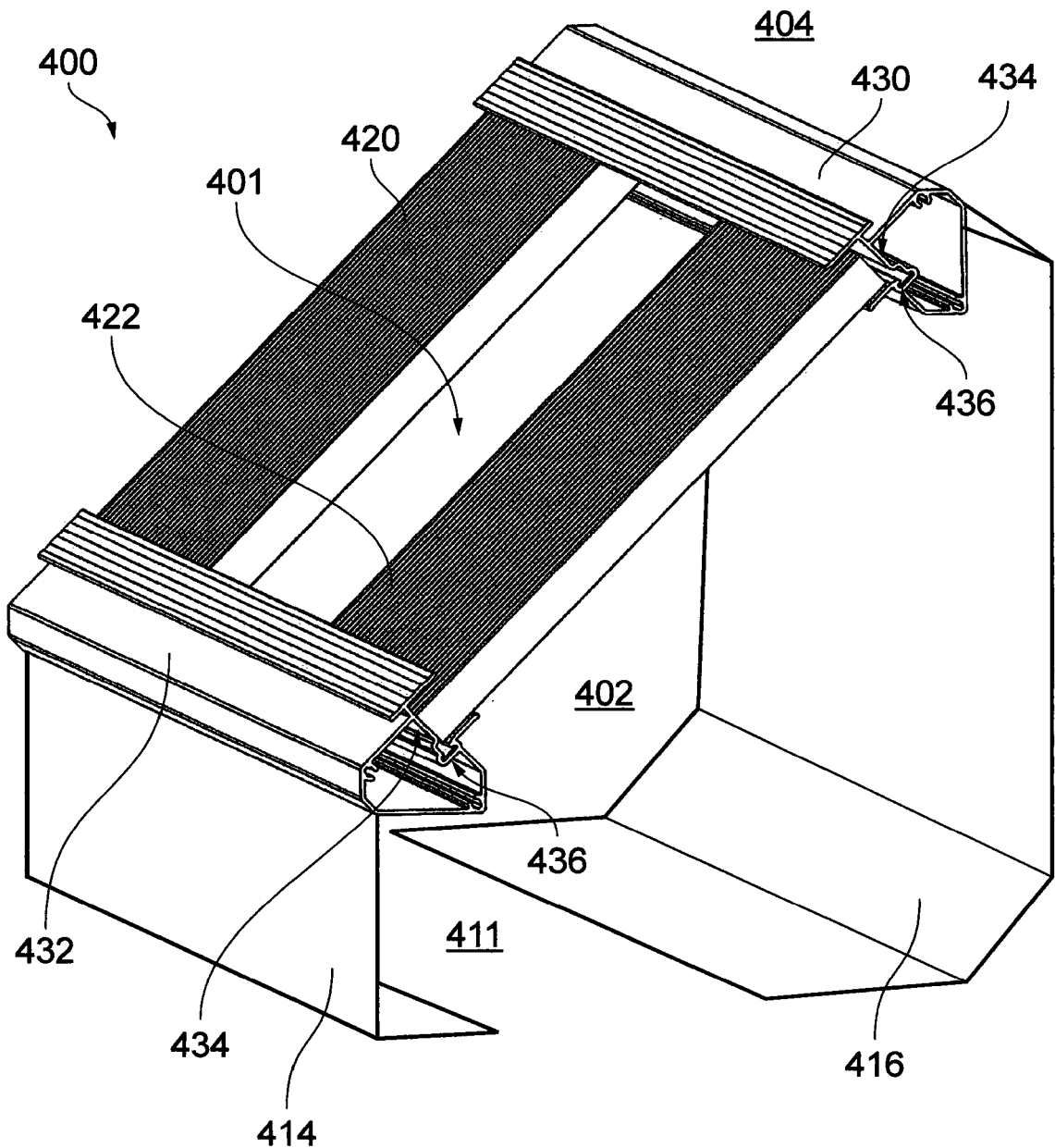
Figure 20:
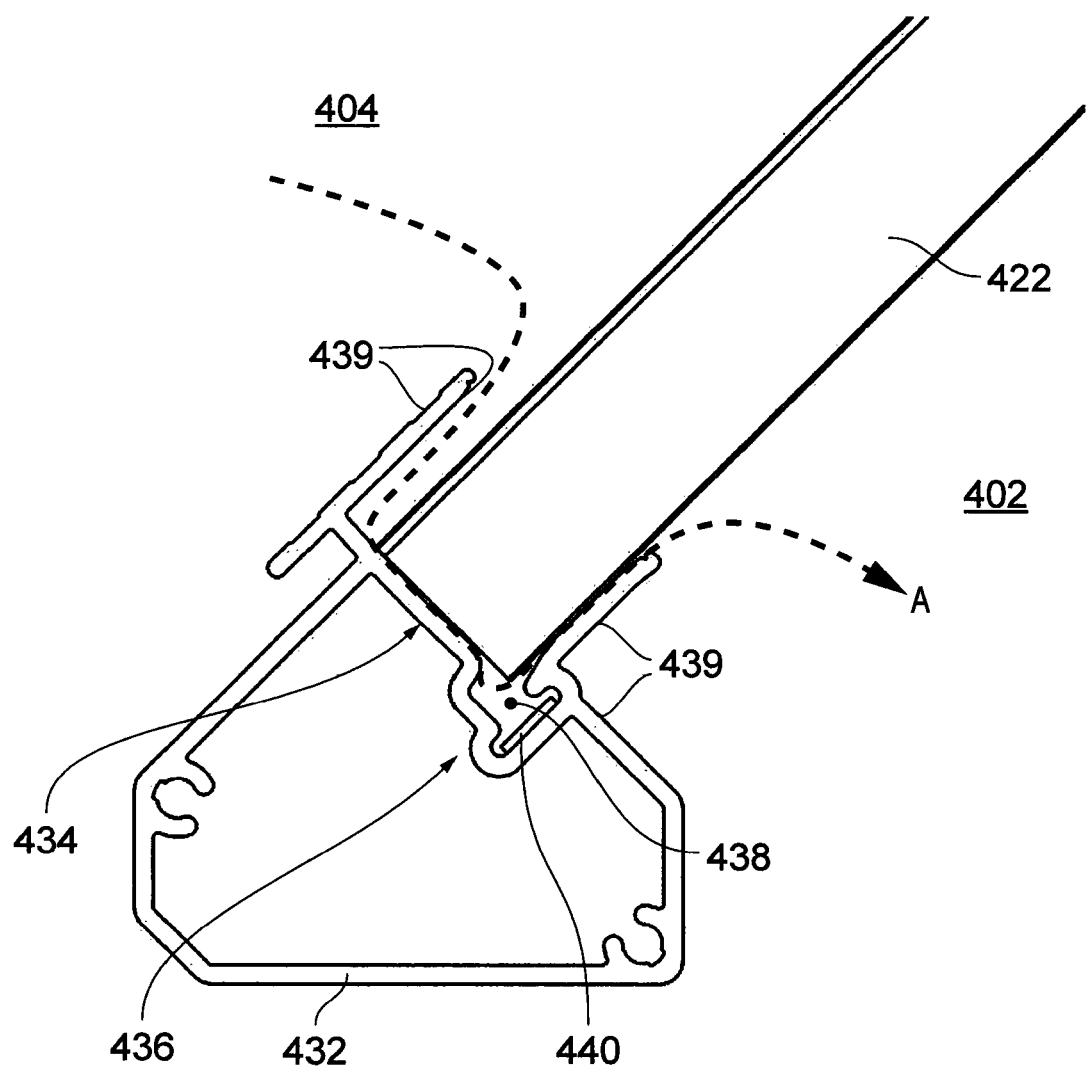
Figure 21:
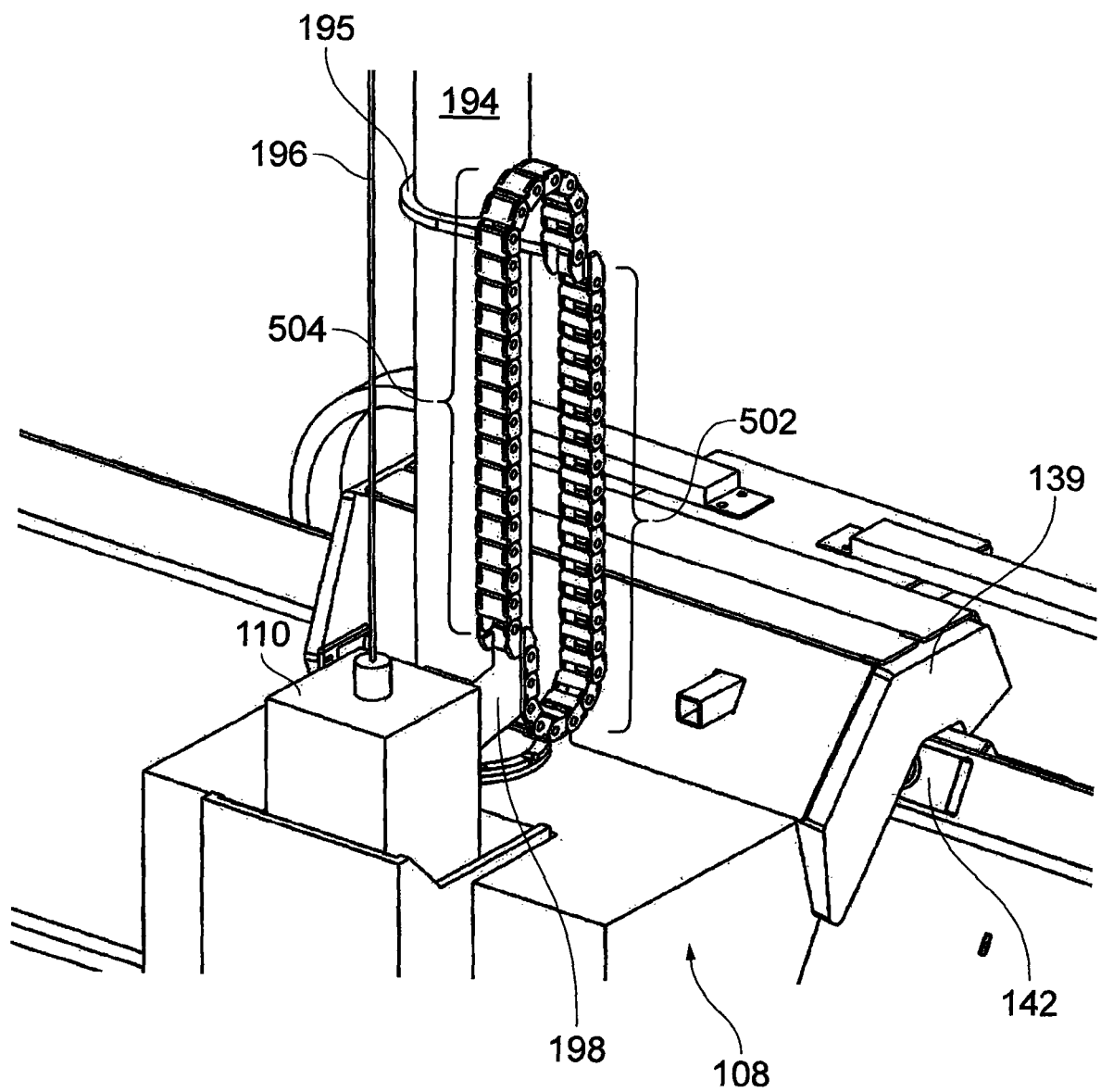
Figure 22:
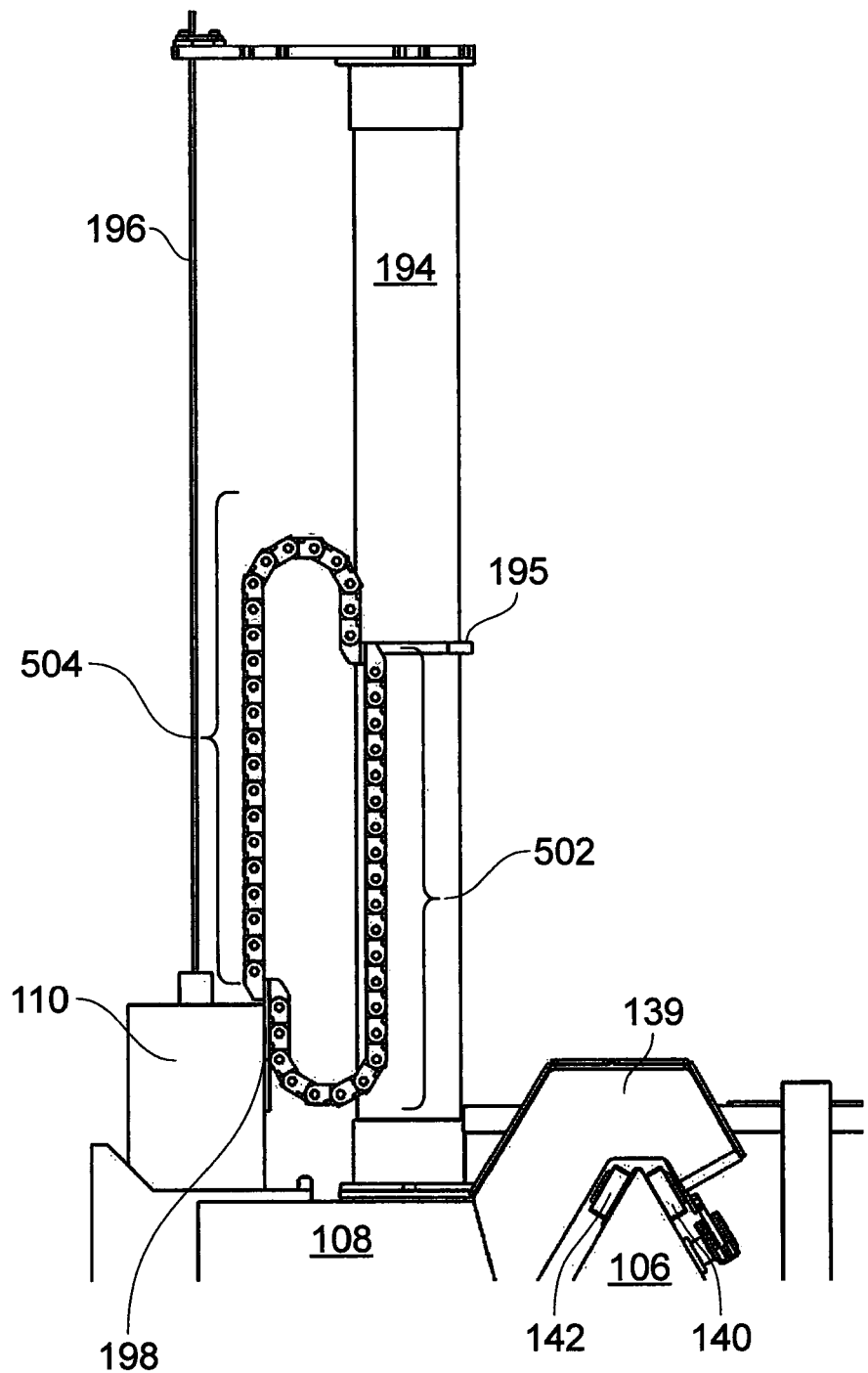
Figure 23:
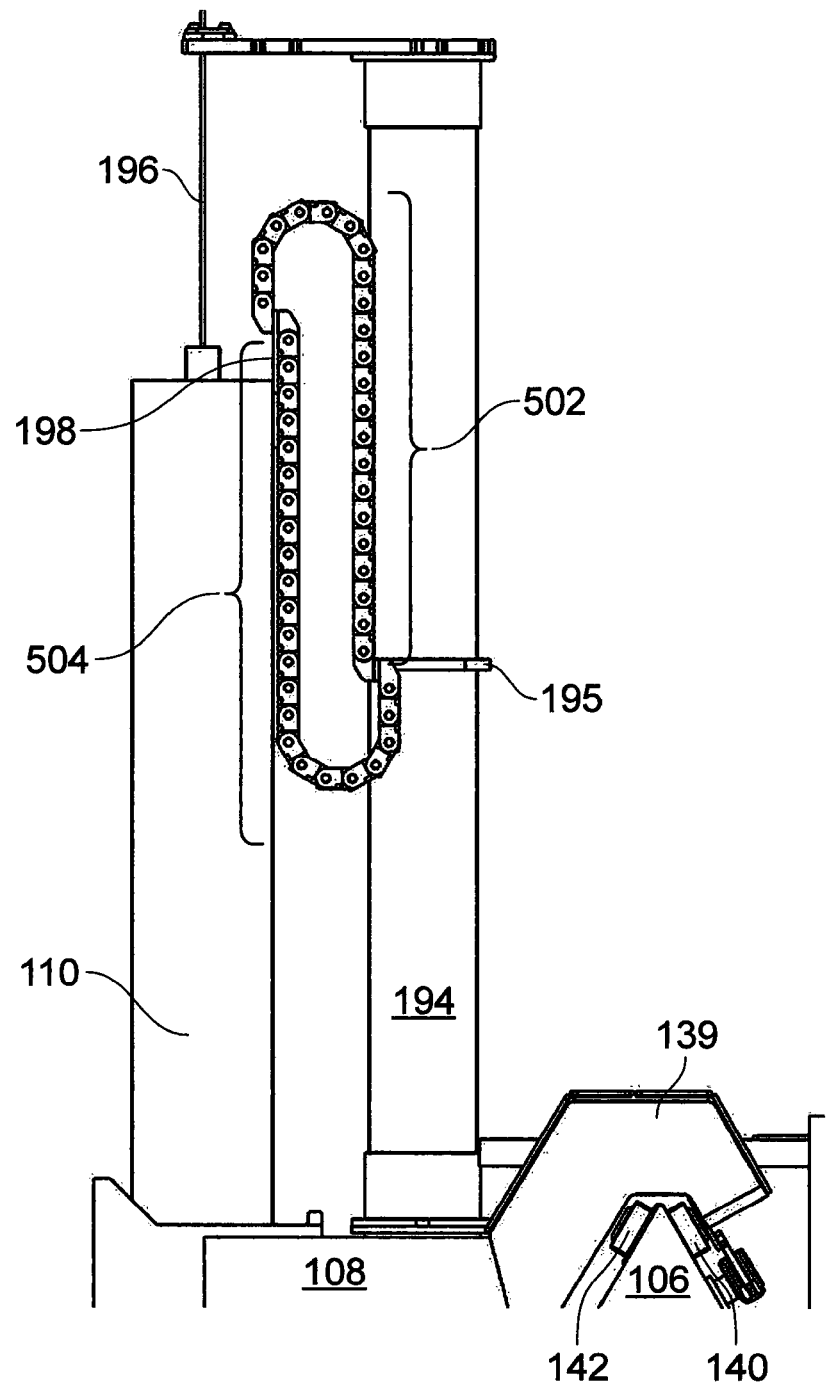
Figure 24:
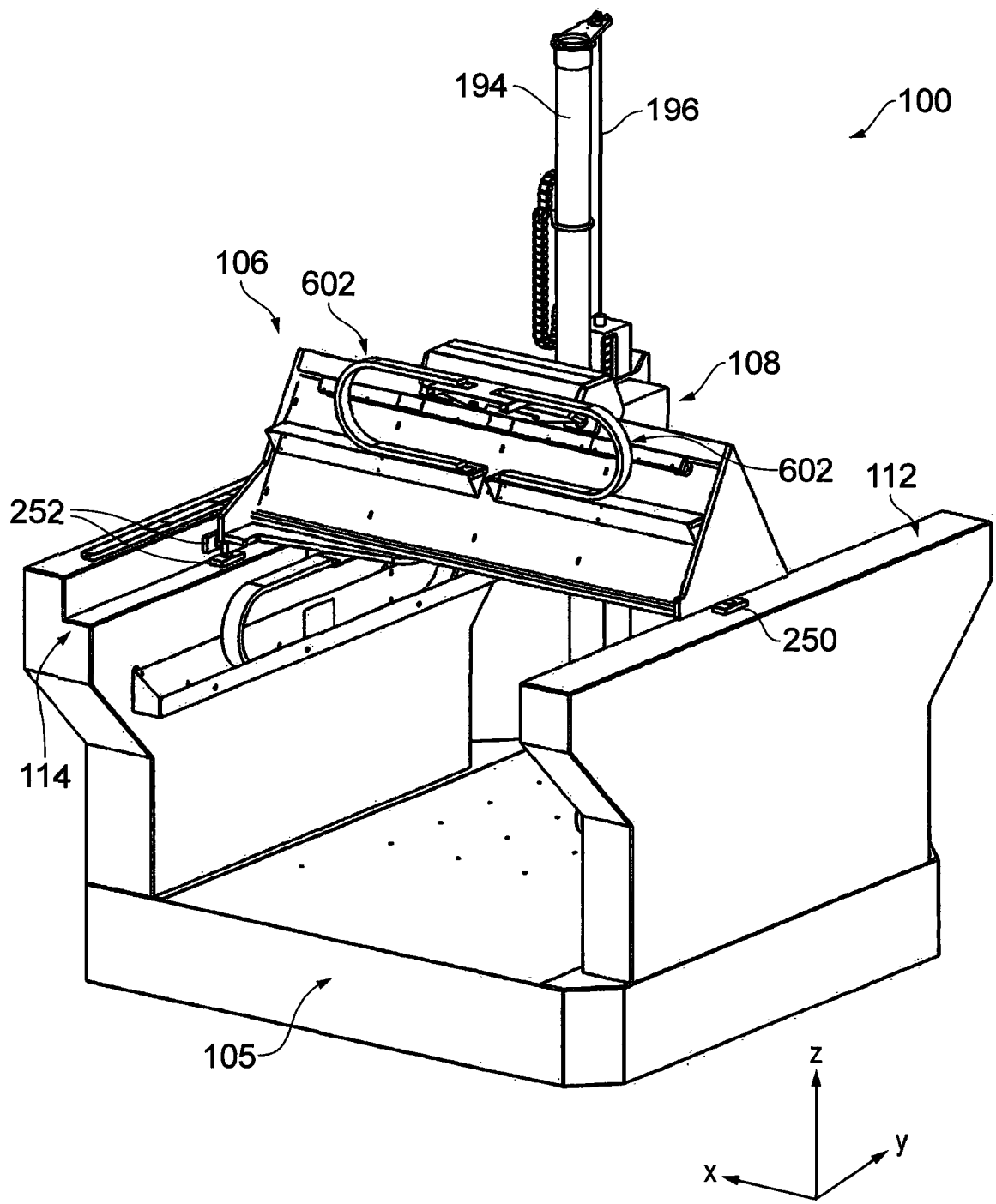

FIG. 17 shows a schematic isometric view of the gantry CMM of FIG. 1 with a protective housing located over one of the raised rails of the y-axis;

FIG. 18 shows the protective housing of FIG. 17 in isolation;

FIG. 19 shows a cut-away view of the protective housing of the cover of FIGS. 17 and 18;

FIG. 20 shows a partial cross-sectional view of the protective housing of FIGS. 17 to 19;

FIG. 21 shows the energy chain arrangement for the z-axis of the CMM of FIG. 1;

FIG. 22 shows a side view of the energy chain arrangement of FIG. 21 with the quill at a lowered position;

FIG. 23 shows a side view of the energy chain arrangement of FIG. 21 with the quill at a raised position; and FIG. 24 is a schematic isometric view of the rear of the CMM of FIG. 1.

An overview of an embodiment of how the invention can be implemented will be described below. In this case, the invention is implemented as part of a CMM 100. FIG. 1 shows a CMM 100 with its protective housings/covers (e.g. "main" covers/"hard" covers) removed so that the relevant components of the CMM 100 can be seen.

As shown, a tool, for example an inspection device such as a probe 102 for inspecting a workpiece, can be mounted on the CMM 100. In the embodiment shown, the probe 102 is a contact probe, in particular a contact analogue scanning probe, for measuring the workpiece by a stylus of the probe contacting the workpiece. However, as will be understood the CMM 100 could carry any sort of inspection device, including touch-trigger probes, non-contact (e.g. optical) probes, or another type of instrument if desired.

In the embodiment shown, the CMM 100 is a gantry-style Cartesian CMM and comprises a platform 105 on which an artefact to be inspected can be placed, and a movement system which provides for repeatable and accurate control of the position of the probe 102 relative to the platform 105 in three orthogonal degrees of freedom X, Y and Z.

In particular, the movement system comprises a cross-beam 106, a carriage 108, and a quill 110. The cross-beam 106 extends between first 112 and second 114 raised rail members and is configured to move along the rails along a Y axis via a bearing arrangement (in this embodiment an air bearing arrangement). The carriage 108 sits on and is carried by the cross-beam 106, and is moveable along the cross-beam along an X axis via a bearing arrangement (in this embodiment an air bearing arrangement which is explained in more detail below). The quill 110 is held by the carriage 108, and is moveable relative to the carriage 108 along a Z axis via a bearing arrangement (again, in this embodiment via an air bearing arrangement). A pneumatic counterbalance mechanism for the quill is provided for counterbalancing the weight of the quill 110 so as to reduce the work required of the quill's motor. In particular, the pneumatic counterbalance is configured to provide an opposing force substantially equal to the weight of the quill 110 (and the articulated head 116 and probe 102) such that substantially zero force is required by the quill's motor to keep it at a stationary position. The pneumatic counterbalance comprises a piston (not shown) within the quill 110. The piston is anchored to a tower 194 (in this case a carbon-fibre tube) via a cable 196. The tower 194 is mounted to the carriage 108 so as to move therewith.

As will be understood, motors, for example direct drive motors such as linear motors, can be provided for effecting the relative motion of the various members along their axis. Also, position encoders (not shown) can be provided for reporting the position of the cross-beam 106, carriage 108 and/or quill 110.

In the particular example shown, an articulated head 116 is provided on the lower free end of the quill 110 for carrying the probe 102. In this case, the articulated head 116 comprises two orthogonal rotational axes. Accordingly, in addition to the three orthogonal linear degrees of freedom X, Y and Z, the probe 102 can be moved about two orthogonal rotational axes (e.g. A and B axes). A machine configured with such an articulated head is commonly known as a 5-axis machine.

Articulated heads for tools and inspection devices are well known, and for example described in WO2007/093789. As will be understood, an articulated head need not necessarily be provided, and for example the probe 102 could be mounted to the quill assembly 110 via a fixed head which does not provide any rotational degrees of freedom. Optionally, the probe itself can comprise an articulated member so as to facilitate rotation about at least one axis.

As is standard with measuring apparatus, a controller 118 can be provided which is in communication with the CMM's motors and position encoders (not shown), the articulated head 116 (if present) and the probe 102 so as to send and/or receive signals to and/or from them so as to control the motion of the relatively moveable members as well as receive feedback and measurement data. A computer 127, e.g. a personal computer (which can be separate to or integrated with the controller 118) can be provided which is in communication with the controller 118. The computer 127 can provide a user friendly interface for an operator to, for example, program and initiate measurement routines. Suitable computers and associated control/programming software is widely available and well known. Furthermore, a joystick 125 or other suitable input device can be provided which enables an operator to manually control the motion of the probe 102. Again, such joysticks are well known and widely available.

The structure of the cross-beam 106 will be described in more detail with reference to FIGS. 3 to 10. As shown, in this embodiment the cross-beam 106 comprises a box beam. The box beam 106 has a modular construction, and in particular in this embodiment comprises three elongate corner members 120, 122, 124, and three pieces of sheet material 126, 128, 130, each forming a load bearing facet (in other words, each forming a planar load bearing member) of the box beam, and each extending between a pair of the three elongate corner members. In the embodiment described, the elongate corner members 120, 122, 124 are extruded, i.e. formed via extrusion. In the embodiment described, the thickness of the three pieces of sheet material 126, 128, 130 is not more than 3 mm. They are made from a metallic material, in particular in this embodiment aluminium, although as will be understood other metallic materials such as stainless steel could be used, or non-metallic materials such as carbon fibre or ceramic could be used. In order to reduce bulk and weight, it can be preferred that the load bearing facets (i.e. the planar load bearing members) of the box beam are formed from sheet material no thicker than 5 mm (above which they would more normally be described as being "plates" rather than "sheets").

If desired the three elongate corner members 120, 122, 124 could be made to be substantially identical. This could help to ensure that the three elongate corner members have substantially the same thermal inertia (e.g. same thermal response characteristics) such that they respond to temperature changes in a common way. This can help to avoid deformation (e.g. twisting or bending) of the box beam 106. For the same reasons, the three pieces of sheet material 126, 128, 130 could also be made so as to be substantially identical. However, as will be understood, the corner members (and/or pieces of sheet material) could be designed to have the same thermal inertia so as to achieve the same effect, even if they are not substantially identical, e.g. even if they do not have the same shape or cross-sectional form.

In the described embodiment, the three elongate corner members 120, 122, 124 and the three pieces of sheet material 126, 128, 130 are formed from the same material type (e.g. aluminium).

In the described embodiment, the first elongate corner member 120 provides first 132 and second 134 bearing surfaces against which air bearings can bear. In the described embodiment, the carriage 108 comprises first and second air bearing assemblies which each comprise first 140 and second 142 air bearing pads connected to each other and to main body 109 of the carriage 108 via a mounting bracket 139 (omitted from FIGS. 4 to 6). The first and second air bearing assemblies straddle the first elongate corner member 120, such that the first air bearing pads 140 bear against the first bearing surface 132 and the second air bearing pads 142 bear against the second bearing surface 134.

In its assembled state, the box beam 106 and carriage 108 are pre-loaded against each other. Such pre-load could be provided by gravity and/or by spring loading. For example, air bearings pads 140, 142, 143 (see FIG. 4) could be rigidly mounted to the carriage 108 (not shown in FIG. 4) and air bearing pad 145 could be spring mounted to the carriage 108 to provide the pre-load.

Figure 5:
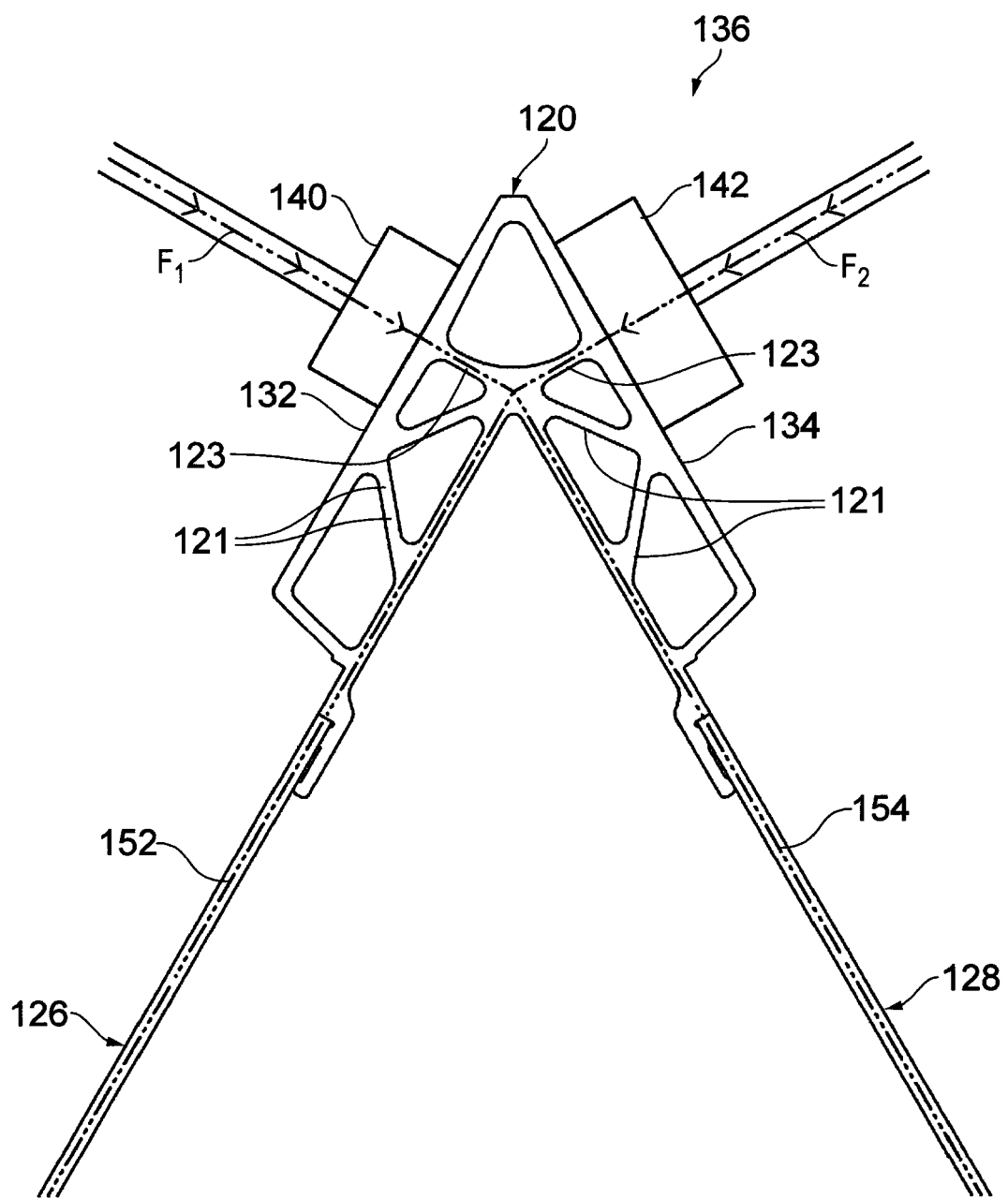
FIGS. 5 and 6 are detail views of the area A identified in FIG. 4.

As schematically illustrated in FIG. 5, the pre-load causes the first 140 and second 142 bearing pads to exert a force on the box beam 106, respectively illustrated by first and second vectors $F_1$, $F_2$. As illustrated, the apparatus is configured such that the forces $F_1$, $F_2$ intersect at the same point at which the planes of the first 126 and second 128 pieces of sheet material intersect. This ensures that the forces transferred into the first elongate corner member 120 can be resolved (and hence the forces can be transferred) directly into/along the (e.g. shear) plane of the first 126 and second 128 pieces of sheet material. Accordingly, the pre-load force, is carried directly along the plane of the sheet material. This helps to avoid buckling of the sheet material and can mean that thinner (and therefore lighter) sheets can be used to support a given pre-load compared to a configuration in which the pre-load forces cannot be carried directly along the plane of the sheet material.

In the embodiment shown, first 140 and second 142 bearing pads are arranged to straddle the first elongate corner member 120. It is known that the forces $F_1$, $F_2$ will be transferred perpendicularly into the first 132 and second 134 bearing surfaces of the first elongate corner member 120. It therefore follows that the forces $F_1$, $F_2$ from the first 140 and second 142 bearing pads will intersect at a predictable point (point 150 shown in FIGS. 6 and 7). This point is predictable along the length of the first elongate corner member 120, and so could be described as being a predictable intersection line. In other words, in this embodiment the forces imparted into the first elongate corner member 120 by the first 136 air bearing assembly at each of the points of cooperation between the two is directed so as to intersect a predetermined elongate target line that extends parallel to the first elongate corner member 120. Since the point of intersection 150 (and hence the elongate target line) is known and is predictable, it is possible to configure the box beam 106 such that the planes 152, 154 of the first 126 and second 128 pieces of sheet material also intersect at substantially the same point (along the same line).

Moreover, as illustrated by FIGS. 6 and 7, in order to ensure that the pre-load forces are primarily carried in/along the (e.g. shear) plane of the first 126 and second 128 pieces of sheet material, it is possible to configure the box beam 106 such that the point of intersection 150 (and i.e. the elongate target line) falls within the vicinity of a notional elongate volume (a cross-section of which is highlighted by the diamond shape 170 shown in FIGS. 7a and 7b) defined by the intersection of a first pair of planes 160 containing the front and back surfaces of the material of the first piece of sheet material 126 (which defines a first load bearing facet/planar load bearing member) with a second pair of planes 162 containing the front and back surfaces of the material of the second piece of sheet material 128 (defining a second load bearing facet/planar load bearing member). In this embodiment, this is facilitated by making the bearing surfaces (e.g. 132, 134) of the elongate bearing tracks (e.g. 120) sit substantially proud relative to the adjacent pieces of sheet material (e.g. 126, 128). In this case, the step S between the surface of the adjacent pieces of sheet material and the bearing surfaces is approximately 18 mm. Also, as indicated in FIG. 5, the extruded bearing tracks 120 are substantially hollow, but comprise a plurality of reinforcing webs 121, 123. As shown, there is one web on each side of the corner which (i.e. web 123) extends perpendicular to the bearing surfaces 132, 134 and is located centrally with respect to the bearing pads 140, 142, such that the pre-load is carried directly through it.

Whilst it can be preferred that the point of intersection 150 falls inside said notional elongate volume 170, it can be sufficient for said point of intersection 150 to be in the vicinity of said notional elongate volume 170. For example, as illustrated in FIG. 7b, it can be sufficient for said point of intersection to be within a greater notional volume 172 which is centred on, but having up to 100%, for example up to 400% (as shown), or more (e.g. up to 900%) cross-sectional area than that of the notional elongate volume defined by the intersection of a first pair of planes 160 containing the front and back surfaces of the material of the first piece of sheet material 126 with a second pair of planes 162 containing the front and back surfaces of the material of the second piece of sheet material 128. Rather than being measured proportionally, the greater notional volume 172 could be determined absolutely, e.g. as illustrated in FIG. 7b, the greater notional volume which is centred on the notional elongate volume, could have a cross-sectional extent that is greater than that of the notional elongate volume by not more than 5 mm on all sides. Such a configuration can help to ensure that the pre-load forces are primarily carried in/along the (e.g. shear) planes of the first 126 and second 128 pieces of sheet material.

Figure 4:
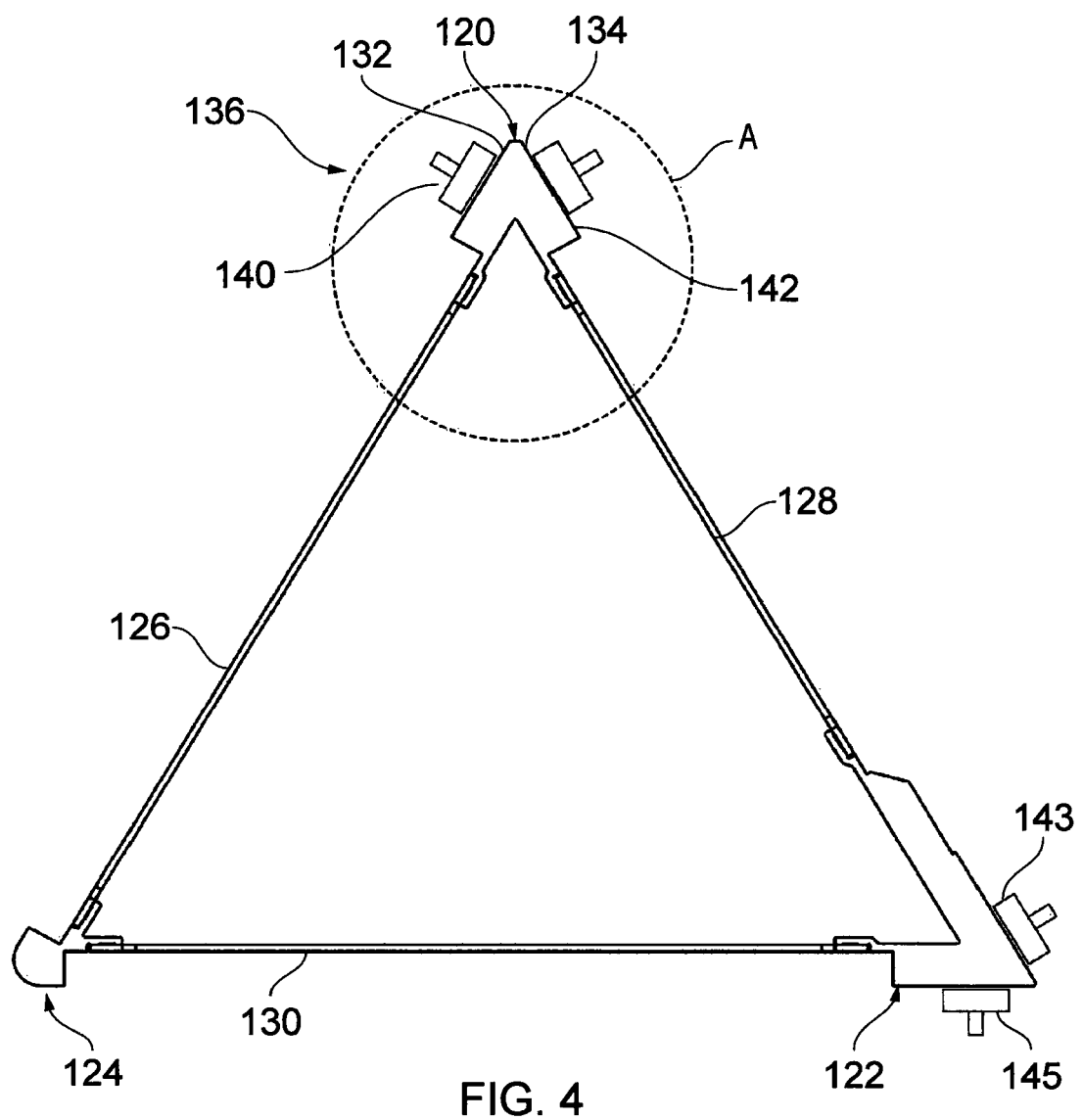
FIG. 4 is a cross-sectional view of the cross-beam of FIG. 3.

The same bearing arrangement is provided between the bearing assemblies on the carriage 108 and the second elongate corner member 122 as schematically illustrated in FIG. 4, such that the pre-load forces imparted into the second elongate corner member 122 is primarily carried in/along the (e.g. shear) planes of the second 128 and third 130 pieces of sheet material.

Since the pre-load forces are primarily carried in/along the (e.g. shear) planes of the first 126, second 128 and third 130 pieces of sheet material of the box beam 106, the inventors have found that other supporting structures like bulkheads are not necessary for supporting the pre-load forces. However, as shown in FIG. 3, the box beam 106 of the present embodiment does have a plurality of bulkheads 180 (shown in isolation in FIG. 9). Providing bulkheads can help manufacture of the beam. The bulkheads can also aid assembly of the different pieces of the box beam by holding them in place during assembly. Also, if the elongate corner members need to be machined to improve their bearing surfaces, and if this machining is done after assembly of the box beam 106, then the bulkheads can help to provide support during such machining. FIG. 8 illustrates an example process 10 for manufacturing the box beam 106. As illustrated, after manufacture of the different parts of the box beam 106 (e.g. after extrusion of the first to third elongate corner members at step 12 and cutting of the first to third pieces of sheet material and the bulkheads at step 14) they are assembled into the box beam at step 16. (As will be understood, the manufacturing steps 12 and 14 could be performed by different parties at different stages to the assembly step 16). In the described embodiment, the assembly step 16 involves joining the first 126, second 128 and third 130 pieces of sheet material to the bulkheads 180 and attaching the first 120, second 122 and third 124 elongate corner members to the first 126, second 128 and third 130 pieces of sheet material.

As shown, the bulkheads 180 are, in the described embodiment, pop/blind riveted "end-on" to the first 126, second 128 and third 130 pieces of sheet material (e.g. as opposed to a folded flap on the bulkheads). This ensures that loads which are directed orthogonally into the first 126, second 128 and third 130 pieces of sheet material are primarily carried in/along the (e.g. shear) plane of the bulkhead 180 enabling them to be made from thinner sheets of material (thereby saving weight). Such an arrangement is possible by the provision of recesses 182 (see FIG. 9) in the edges of the bulkheads which have a narrowed/restricted neck 184, through which the pop/blind rivets 188 can be accepted. When the rivet is expanded, it can grip against the sides of the recess 182 (e.g. against an inside shelf 186 at the end of the neck 184) thereby securing the bulkhead to the sheet of material (e.g. the first piece of sheet material 126 as shown in FIG. 10) which provides the load bearing facet/planar load bearing member of the box beam 106.

In the described embodiment, the varies pieces of the beam 106 are then glued together using adhesive. For example, the first 120, second 122 and third 124 elongate corner members are glued to the first 126, second 128 and third 130 pieces of sheet material (e.g. via an appropriate adhesive, such as a single part, heat cured, epoxy, for example PERMABOND® ES569 available from Permabond Engineering Adhesives Limited). Also, the bulkheads 180 can be glued to the first 126, second 128 and third 130 pieces of sheet material (e.g. using the same adhesive).

Once assembled, the box beam 106 is then loaded into a machine tool (not shown) at step 18 (see FIG. 8). In the embodiment described, this is done via the end bulkheads 180 which have mounting features in the form a hole 190 which a corresponding mating member on the machine tool can engage. In view of this, the end bulkheads can be thicker than the inner bulkheads in order to withstand the mounting forces. For example, the end bulkheads could be 6 mm thick whereas the inner bulkheads could be 3 mm thick since the inner bulkheads.

Once loaded into the machine tool, the first 120 and second 122 elongate corner members are machined at step 20 to improve the finish of the air bearing surfaces (e.g. 132, 134), e.g. to make them flatter/smoother and optionally to improve how parallel they are to each other.

In the embodiment described a direct drive motor 200, in particular a linear motor 200, is used to drive the cross-beam 106 along the y-axis. A linear motor can be advantageous in that it can help to facilitate a servo system with high servo stiffness. The arrangement of the linear motor 200 on the CMM 100 is shown in FIGS. 11*a* and 11*b*, and will be described in more detail in connection with FIGS. 1 to 16. As shown, the linear motor 200 comprises a stator 202 and an armature 204. The armature 204 is mounted to the cross-beam 106 (which in this embodiment is formed from aluminium), and the stator 202 is mounted to the second raised rail member 114 (also formed from aluminium). As will be understood, the armature 204 comprises a plurality of coils 206 mounted to a body 205 (e.g. as shown in FIG. 16) and the stator 202 comprises a plurality of magnets 208 mounted along its length on opposing inner sides of a U-shaped body 207 (e.g. as shown in FIGS. 12 to 14), so as to define a channel 209 in which the armature can be received. In the embodiment described the U-shaped body 207 comprises a steel material, which is particularly appropriate for a linear motor stator body (for containing the magnetic field of the stator's magnets 208 and improving the magnetic flux density). Also, in the embodiment described, the body 205 of the armature is made from a non-ferrous material such as aluminium. As will be understood by those familiar with linear motors, current can be passed through the armature's coils 206 in a controlled manner so as to cause the armature 204 (and hence the cross-beam 106 to which it is fixed) to be pushed along the stator 202 (and hence along the first 112 and second 114 raised rail members). In the embodiment described, the linear motor is an ironless core linear motor. This reduces forces between the armature and stator in directions other than in the direction of motion, thereby reducing the stiffness requirements of their respective mounts, and thereby reducing forces on the metrology loop (which could vary along the axis if the armature and stator are not perfectly aligned). As shown, the coils of the armature are not overlapping.

In this embodiment, air bearings facilitate low-friction motion between the cross-beam 106 and the first 112 and second 114 raised rail members. In particular, at a first end of the cross-beam 106 there is provided a first air bearing arrangement comprising an air bearing pad 250 which bears against the first raised rail member 112. At the opposing, second end, of the cross-beam 106 there is provided a second air bearing arrangement comprising a plurality of air bearing pads 252 which bear against different facets of the second raised rail member 114. As will be understood, additional air bearing pads to those shown may be provided, e.g. so as to provide a pre-load between the beam 106 and the first 112 and second 114 raised rail members. As will be understood, other types of bearing, including mechanical bearings, can be used as well as or instead of the air bearings.

In the embodiment described, the stator 202 comprises a plurality of stator modules 220 (which in this embodiment are identical, although this need not necessarily be the case) which are connected to each other via connector members 222 (in this case plates 222 which are bonded to adjacent stator modules) so as to provide two stator assemblies. In particular, a first stator assembly comprises first 220*a*, second 220*b* and third 220*c* stator modules connected in series via plates 222, and a second stator assembly comprises fourth 220*d*, fifth 220*e* and sixth 220*f* stator modules connected in series via plates. FIG. 12*a* shows a stator assembly in isolation comprising a plurality of stator modules (e.g. 220*a*, 220*b*, 220*c*) connected via plates 222. As will be understood, a stator assembly can essentially be considered to be equivalent to one stator module, and so the explanations below in connection with the stator assembly is equally applicable to a stator assembly comprising a single stator module (shown in FIG. 12*b* in isolation) and vice versa. In other words, a stator assembly could comprise just a single stator module (e.g. having just a single unitary U-shaped body, rather than separate bodies joined together by plates 222)

In the embodiment described, the armature 204 also comprises a plurality of armature assemblies 224 (which in this embodiment are identical, although this need not necessarily be the case) which are each connected to a bracket 300. For simplicity, FIG. 16 shows only one armature assembly 224. As will be understood, even though in the described embodiment there is provided an armature 204 comprising a plurality of armature assemblies 224, this need not necessarily be the case, and the armature could comprise just one armature assembly. (Also, in the described embodiment, each armature assembly 224 comprises just a single armature module, but as with the stator assembly of the described embodiment, an armature assembly 224 could comprise a plurality of armature modules connected together, e.g. via plates. As per the composite stator assembly, such a composite armature assembly could be fixed to the bracket toward a first end via the rigid mounting of one of the armature modules, and fixed to the bracket toward a second end via the flexible mounting of one of the other armature modules).

Such a modular arrangement of the stator and/or armature can aid manufacture of the CMM 100.

As described in more detail below, each stator assembly and each armature assembly is mounted to its respective member in a way which permits longitudinal expansion and/or contraction relative to its respective member. With regard to the stator assemblies (e.g. the first stator assembly comprising the first 220*a*, second 220*b* and third 220*c* stator modules), this is achieved in the particular embodiment described by providing the stator assembly with a fixed mounting assembly 260 at one end and a compliant mounting assembly 270 at its other end. With reference to FIG. 15, the fixed mounting assembly 260 is illustrated. As shown, the fixed mounting assembly 260 comprises a spacer member 262 which is rigidly secured to the second raised rail member 114 (e.g. via bonding and/or screwing) and a screw 264 which extends through a hole/slot 266 provided at a first end of the stator 202/stator module 220 (e.g. see FIG. 12). The screw 264 is received in a threaded bore in the spacer member 262 and is tightened so that the screw's 264 head engages the body 207 of the stator 202/stator module 220 so as to rigidly clamp the stator 202/stator module 220 to the spacer member 262 and therefore to the second raised rail member 114.

With reference to FIGS. 13 and 14, the compliant mounting assembly 270 comprises an elongate slot 268 (see also FIG. 12) formed in the body 207 at the first end of the stator 202/stator module 220 (at the end opposite to the hole/slot 266) and a sliding mount. The sliding mount comprises a spacer member 276 a post member 272 (which extends into the slot to control the transverse location of the stator assembly/stator module 220) and a magnet 274 which is configured to attract and hold the steel body 207 of the stator assembly/stator module 220 to the spacer member 276 (and therefore to the second raised rail member 114). In the embodiment described the magnet 274 is ring-shaped and extends around the post member 272. The elongate slot 268 and post member 272 are configured so that the stator 202/stator module 220 and post member 272 are free to slide relative to each other along the length of the elongate stator assembly/stator module 220 (i.e. in the direction of arrow A in FIG. 13). By way of such relative sliding, relative expansion and/or contraction of the stator assembly/stator module 220 and the member it is mounted on (in this case the second raised rail member 114) is facilitated. As will be understood, such relative expansion and/or contraction could be as a result of heat from the motor and/or due to differences in coefficients of thermal expansion of the parts which mean that they expand/contract at different rates with changes in ambient temperature.

As is also shown in FIG. 14, a screw 278 can be screwed into a threaded bore in the post 272. However, unlike the screw 264 of the fixed mounting assembly 260, the head of the screw 278 of the compliant mounting assembly 270 does not engage the body 207 of the stator 202/stator module 220 and so does not act to clamp the stator 202/stator module 220 to the spacer member 276 and therefore to the second raised rail member 114. Rather, there is a small gap between the head of the screw 272 and the body 207. Accordingly, the screw 272 merely acts as a safety mechanism to prevent the stator 202/stator module 220 from being pulled off the second raised rail member 114.

Each of the first and second stator assemblies can be mounted in this way, with a gap between them to facilitate their expansion. Also, as will be understood, rather than connected stator modules into stator assemblies, each stator module could be connected individually, for example in the way described above, with gaps between each of them to facilitate their expansion. Alternatively, there could be provided just one monolithic stator module (again mounted in the manner described above via fixed and compliant mounting assemblies). This is also the case for the armature as described in more detail below.

As will be understood, such expansion/contraction can be facilitated in other ways. For example, with reference in particular to FIG. 16, an armature assembly 224 of the armature 204 comprises a fixed mounting assembly 290 at one end and a compliant mounting assembly 292 at another end. The fixed mounting assembly 290 comprises a screw 291 which extends through a hole in the body 205 of the armature module 224 and engages a threaded bore in a bracket 300 (which is in turn rigidly mounted to the crossbeam 106) so as to rigidly clamp the body 205 of the armature assembly 224 to a bracket 300. At the other end, the compliant mounting assembly 292 comprises a flexure arm 294. A first end of the flexure arm is screwed rigidly to the bracket 300 via (in this case) two screws 293, and at the second end is attached to the body 205 of the armature module 224. The flexure arm 294 is configured to flex in the longitudinal direction of the armature module 224 (i.e. in the direction of arrow B) so as to facilitate relative expansion and/or contraction of the bracket 300 and the armature module 224, but is relatively stiff in directions perpendicular thereto (i.e. in directions perpendicular to arrow B).

Such an arrangement could be used in place of the sliding mount of the stator module 220/stator 202, and vice versa.

The arrangements described help to accommodate longitudinal expansion and/or contraction of the armature assembly and/or stator assembly relative to its respective member, whilst maintaining the servo stiffness of the apparatus.

In the embodiment described, both the stator assemblies and the armature assemblies are mounted to their respective members in a way which permits longitudinal expansion and/or contraction relative to its respective member. However, as will be understood, it is possible for just the stator assemblies or just the armature assemblies to be mounted in such a way to permit longitudinal expansion and/or contraction relative to its respective member.

The linear motor arrangement is described above in connection with the CMM's y-axis. As will be understood, the same or a similar arrangement can be used for effecting motion in the x and/or z axes. Likewise, similar bearing arrangements (e.g. air bearings) can be used for the x and/or z axes.

As will be understood, it is common for CMMs to be provided with one or more protective housings (covers) to protect various parts of the CMM from external contamination and objects. Turning now to FIGS. 17 and 18, there is shown an example of such a type of protective housing (cover) 400 configured to protect the linear motor 200 of the CMM's y-axis and also the above mentioned second air bearing arrangement (comprising the air bearing pads 252, and the respective bearing surfaces on the second raised rail 114). This protective housing (cover) 400 will be described in more detail in connection with FIGS. 17 to 20.

The protective housing 400 together with the structure of the CMM 100, in particular the structure of the second raised rail 114 define an internal volume 402 within which the linear motor 200 and the air bearing pads 252 (and their respective bearing surfaces) of the second air bearing arrangement are located and protected from contamination and objects located in the external operating environment 404.

The protective housing 400 comprises first 410 and second 412 end plates, and front 414 and back plates 416 (which in this case are folded to provide multiple facets as shown in FIG. 19, and is configured to be received over and capture the second raised rail 114. The first 410 and second 412 end plates are secured to the second raised rail 114 by fasteners (e.g. mechanical fasteners such as screws) to hold it in place. An elongate opening 401 in the protective housing 400 is provided such that the cross-beam 106 can extend into the protective housing and such that its bearing pads can cooperate with the second raised rail 114 to facilitate guided relative motion with the second raised rail. The protective housing 400 further comprises a retractable dust cover in the form of first 420 and second 422 bellows. A bellows frame 424 is provided for attaching the bellows to the cross-beam 106 such that they expand and contract with movement of the beam 106. Upper 430 and lower 432 bellows tracks (in the form of channels) are provided, in which the upper and lower sides of the bellows 420, 422 are received, such that they are guided as they expand and contract with movement of the beam 106.

The first 420 and second 422 bellows expand and collapse/fold with movement of the cross-beam 106 along the y-axis. In particular, the cross-beam 106 is connected to the frame 424 which slides with the cross-beam 106 so as to push and pull the first 420 and second 422 bellows as the cross-beam 106 moves back and forth along the y-axis. As shown in more detail in FIGS. 19 and 20, the first 420 and second 422 bellows sit within and are guided by the first 430 and second 432 bellows tracks. In particular, each of the upper 430 and lower 432 bellows tracks comprise a channel 434 within which the upper and lower sides/edges of the first 430 and second 432 bellows sit and can slide.

As shown in FIGS. 19 and 20, each channel 434 comprises a contamination trap 436. As most clearly shown in FIG. 20, the contamination trap 436 comprises a groove 438 which runs along the length of the channel 434 in which dirt can collect away from the bellows 422. Also, an elongate magnetic strip 440 can be located within the groove 438, this can attract and hold ferromagnetic contamination/dirt trying to enter the internal volume 402 defined by the protective housing 400.

As will be understood, the protective housing 400 does not provide a hermetic seal between the internal volume 402 defined by the protective housing 400 and the CMM's external operating environment 404. Accordingly, there will be some flow of air between the internal volume 402 and the CMM's external operating environment 404. In particular, due to the movement of the first 420 and second 422 bellows along the channels 434, there can be "leakage" between the internal volume 402 and the CMM's external operating environment 404, for instance around the sides of the bellows 420, 422 as illustrated by dashed arrow A in FIG. 20. Dirt and contamination can be entrained in such a flow of air. Our inventors have found that providing a trap, such as a groove 438, can help to reduce the amount of such entrained dirt and contamination entering the internal volume 402. This can be beneficial in maintaining the performance, reliability and/or lifespan of the CMM 100, such as the air bearings and motors located in the internal volume 402. In particular, providing a magnet 440 in the groove can help to attract, remove and retain ferromagnetic contamination or dirt present in the air flow A. This has been found to be particularly useful in embodiments in which the motor comprises a linear motor 200 (which typically comprise plurality of strong, exposed magnets). Such a ferromagnetic trap 436 helps to reduce the amount of ferromagnetic contamination reaching the motor linear 200 which would affect the performance and lifespan of the linear motor 200.

As will be understood, in other embodiments a plurality of (e.g. non-elongate) magnets could be placed in the groove 438, rather than one elongate strip. Furthermore, the magnet(s) need not be located in a groove. For example, one or more magnets could be located adjacent the channel 434 (e.g. on any of the surfaces identified by reference numeral 439) and would attract and retain at least some of the ferromagnetic material entrained in the air flow along A. However, the provision of a groove can help to trap any contamination and dirt, and also helps to keep such contamination and dirt away from other parts of the CMM, including the first 420 and second bellows 422 (the sliding of which would otherwise be affected by the collection of contamination and dirt in the channels 434).

The elongate magnetic strip 440 could be removable. For example, it could just rest in the groove 438 and/or be held by releasable means, such as a releasable (e.g. mechanical) fastener and could be accessible for removal via end caps 442 provided on the end plates 410. When opened/removed, such end caps 424 can help to facilitate cleaning and/or replacement of the elongate magnetic strip 440 (by enabling them to be slid out of the groove), and/or cleaning of the groove 438.

This concept of providing a contamination trap is described above in connection with the CMM's y-axis. As will be understood, the same or a similar arrangement can be used for the x and/or z axes.

As is normal on a positioning apparatus such as CMM 100, an energy conduit (or "energy chain") exists between the moveable members of the apparatus which comprises the necessary wires and pipes such that electrical power, signals and/or fluid (such as air for air bearings), can be delivered to and/or from the moveable member (and/or downstream members, instruments and the like, such as articulated probe heads and probes).

With particular reference to FIGS. 21 to 23, in the present embodiment, two energy conduits (first 502 and second 504 energy conduits) are provided between the quill 110 and the carriage 108 which each comprise one or more electrical wires for providing power and communications to and/or from the quill 110, the articulated probe head 116, and the probe 102. The first 502 and second 504 energy conduits can also comprise one or more pipes for supplying air to the quill's air bearings (not shown). In the embodiment described, each of the first 502 and second 504 energy chains comprise a support track which flexes with relative movement of the quill 110 and carriage 108. The support tracks are configured to keep the wires and pipes associated with it tidy and to control how they flex with the relative movement of the quill 110 and carriage 108. A first end of each support track of the first 502 and second 504 energy chains is connected to the carriage 108 (in this case to the carriage's counterbalance tower 194, via bracket 195), and a second end of each support track of the first 502 and second 504 energy chains is connected to the quill 110 (in this case via a bracket 198).

Providing two energy chains between the relatively moveable members (e.g. between the quill 110 and the carriage 108) means that they can be configured such that the load they each impart on the relatively moveable members varies inversely to each other. For example, our inventors found that providing just a single energy chain (e.g. first energy chain 502) meant that the load imparted on the quill 110 varied depending on the position of the quill 110 relative to the carriage 108. This is because the energy chain itself imparts a load on the quill 110 and carriage 108. For example, in the embodiment described the load caused by the weight of the first energy chain 502 shifts from being predominately carried by the carriage 108 when the quill 110 is at a vertically low position (see FIGS. 21 and 22) to being predominately carried by the quill 110 when the quill 110 is at a vertically high position (see FIG. 23). Such varying load can have an adverse effect on the metrology of the CMM 100. In particular, our inventors found that the quill's motor had to work harder at increased heights of the quill 110. In particular, because the motor of this embodiment is a direct drive motor (and in particular a linear motor), it was found that a significantly varying amount of heat was produced by the motor dependent on the position of the quill 110. As will be understood, the structure of the apparatus can change depending on its temperature and therefore a varying heat source such as the motor can lead to poorer than desired metrological performance.

Our inventors found that this effect can be reduced, and even avoided, by providing a compensatory member which is configured to apply a load that varies dependent on the relative position of the quill 110 and the carriage 108, so as to at least partially counteract the change in load applied by the first energy conduit 502 (that is dependent on the relative position of the quill 110 and the carriage 108). In the embodiment described, the compensatory member comprises the second energy conduit 504 which is connected to the quill 110 and carriage 108 in a manner such that the loads they impart on the quill 110 and carriage 108 vary substantially equally and oppositely. Accordingly, the first 502 and second 504 energy conduits could be described as being "balanced". In the embodiment described, this is achieved by ensuring that the first 502 and second 504 energy conduits are substantially identical, at least between the members they are connected. For example, the articulated support tracks of the first 502 and second 504 energy conduits are substantially identical in configuration, and the mass of the wires and/or pipes are evenly split between the first 502 and second 504 energy conduits. As will be understood, benefit can still be obtained even if the load imparted by the compensatory member does not vary substantially equally and oppositely, but it can be preferred that the load it imparts does vary substantially equally and oppositely.

As will be understood, other arrangements are possible. For example, rather than substantially equally sharing the wires and pipes between the first 502 and second 504 energy conduits, they could be shared in a substantially non-equal way. Furthermore, it might be that the second energy conduit is a "dummy" energy conduit in that it does not carry/guide any wires or pipes. Accordingly, the support track of the dummy second energy conduit might be provided merely as a compensatory member. In this case the support track of the dummy second energy conduit could be configured differently to the support track of the first energy conduit such that the load the support track of the dummy second energy conduit imparts on the members is substantially equal and opposite to that of the first energy conduit (which comprises the track and the wires and pipes). For example, the mass of the support track of the dummy second energy conduit 504 can be greater than that of the support track of the first energy conduit 502 to compensate for the mass of (and resistance provided by) the wires and pipes of the first energy chain 502.

In the embodiment described, the support track of each of the first 502 and second 504 energy conduits comprises a chain-like arrangement of pivotally connected links, but this need not necessarily be the case. For example, the support tracks of the first 502 and second 504 energy conduits could comprise a continuous ribbon-like band of material which bends with the relative movement of the quill 110 and carriage 108. Optionally, no support tracks are provided and the wires and pipes could for example be tied together to keep them tidy. In this case, in accordance with this embodiment of the invention the wires and pipes could be split into first and second bunches and tied together to provide the first 502 and second 504 energy chains. Accordingly, in this case the second bunch could be considered to be the compensatory member, for example.

The concept of having a compensatory member which is configured to apply a load that varies dependent on the relative position of the moveable members of the CMM so as to at least so as to at least partially counteract the change in load applied by an energy conduit has been described above in connection with the quill 110 and carriage 108. This is because the effect of the varying load is most pronounced due to the shift in weight carried between the quill 110 and carriage 108 due to the relative vertical motion. However, the concept of having such a compensatory member has also been found to be beneficial for the other axes of the CMM too, which provide for horizontal relative motion (and so are not subject to varying weight loads in the direction of motion), since the back-driving force applied by an energy conduit to a relatively moveable member can vary depending on the position of the moveable member along the axis. For example, such an arrangement of two substantially balanced energy conduits between horizontally moveable members can be seen in FIG. 24 where first 602 and second 604 energy conduits are provided between the beam 106 and the carriage 108. As with the first 502 and second 504 energy conduits between the carriage 108 and quill 110, the first 602 and second 604 energy conduits between the beam 106 and carriage 108 comprise one or more electrical wires and one or more pipes. Also, as with the first 502 and second 504 energy conduits between the carriage 108 and quill 110, the first 602 and second 604 energy conduits between the beam 106 and carriage 108 are configured such that the load they impart on their members (e.g. the carriage 108) varies substantially equally and oppositely with the relative movement of the carriage 108 along the beam 106. However, unlike the first 502 and second 504 energy conduits between the carriage 108 and quill 110, the first 602 and second 604 energy conduits comprise continuous ribbon-like bands of material which bend with the relative movement of the carriage 108 and beam 106 so as to guide the wires and pipes (rather than comprising a chain-like arrangement of pivotally connected links).

Providing a compensatory member can help to reduce or even avoid any change in the resultant load caused by the back-driving force. This is particularly advantageous where a direct drive motor (such as a linear motor) is used to effect the relative movement due to the above described heat dissipation issues which direct drive motors (e.g. linear motors) are particularly sensitive to. In particular, ensuring that the compensatory member substantially balances the force applied by the first energy chain (e.g. such that the resultant load applied to the moveable member by the energy chain and compensatory member is not more than 5 Newtons (N), and optionally not more than 4N, for example not more than 3N, for instance not more than 2N or even not more than 1N along at least 75%, optionally along at least 90% of its moveable extent along the axis) can ensure that heat dissipated by the motor is not excessive. Furthermore, providing a compensatory member which provides a force to the moveable member which varies inversely to that provided by the first energy chain such that the change in resultant load applied to the moveable member by the energy chain and compensatory member is not greater than 3N, optionally not more than 2N, and for example not more than 1N along at least 75%, optionally along at least 90%, of its moveable extent can ensure that variations in heat dissipated by the motor along the axis is kept within a reasonable level.

In the embodiments described, the bearing assembly comprises an air bearing. However, as will be understood, the invention is also applicable to non-air bearing assemblies. For example, mechanical bearings, such as ball race bearings, could be used.

As will be understood, the invention and design principles thereof is also applicable to other parts of the CMM 100 (e.g. to the quill 110), and also to other types of CMM, including bridge, column, horizontal arm and cantilevered CMMs (as a non-exhaustive list). The invention is also not limited to CMMs, but is applicable to other positioning apparatus including machine tools.

The invention claimed is:

1. A coordinate positioning apparatus comprising a load bearing structure, the load bearing structure comprising
   at least one elongate corner piece providing at least two bearing surfaces, one on each side of the corner, for a carriage moveable along the load bearing structure, and
   at least one piece of sheet material which extends along the at least one elongate corner piece and provides at least one load bearing facet,
   wherein the at least one elongate corner piece and the at least one piece of sheet material are separately-formed pieces.

2. The coordinate positioning apparatus as claimed in claim 1, wherein the at least one piece of sheet material is arranged to provide at least one load bearing facet on each side of the corner piece.

3. The coordinate positioning apparatus as claimed in claim 1, wherein the load bearing structure comprises at least two elongate corner pieces, each providing two bearing surfaces on either side of their respective corners.

4. The coordinate positioning apparatus as claimed in claim 3, wherein the at least two elongate corner pieces are configured to have substantially the same thermal inertia.

5. The coordinate positioning apparatus as claimed in claim 1, wherein the load bearing structure comprises:
   two elongate corner pieces that each provide at least two bearing surfaces,
   a further elongate corner piece, and
   first, second and third pieces of sheet material respectively extending along and between first, second and third pairs of the corner pieces so as to provide load bearing facets therebetween.

6. The coordinate positioning apparatus as claimed in claim 1, wherein the load bearing structure comprises at least one sheet material bulkhead.

7. The coordinate positioning apparatus as claimed in claim 1, wherein the at least one piece of sheet material is not more than 3 mm thick.

8. The coordinate positioning apparatus as claimed in claim 1, comprising a carriage moveable along the load bearing structure, the carriage comprising bearing members which bear against the bearing surfaces of the at least one elongate corner piece.

9. A coordinate positioning apparatus comprising a platform on which an artefact can be placed and a movement system for carrying and effecting relative movement of a tool relative to the platform, the movement system comprising:
   a first body comprising at least one bearing surface, and
   a second body comprising at least one bearing member which interacts with the at least one bearing surface so as to facilitate relative movement of the first and second bodies, the first and second bodies being pre-loaded together, the pre-load being carried through the at least one bearing member and the at least one bearing surface,
   wherein the first body comprises (i) at least one elongate bearing track member providing the at least one bearing surface and (ii) at least one piece of sheet material which extends along the elongate bearing track member, the at least one elongate bearing track member and the at least one piece of sheet material being separately-formed pieces, and
   wherein the coordinate positioning apparatus is configured such that resultant force imparted into the at least one elongate bearing track member by the at least one bearing member of the second body due to the pre-load is primarily carried by the at least one piece of sheet material.

10. The coordinate positioning apparatus as claimed in claim 9, configured such that the resultant force imparted into the at least one elongate bearing track member by the at least one bearing member of the second body due to the pre-load is resolvable directly into and along a shear plane of the at least one piece of sheet material.

11. The coordinate positioning apparatus as claimed in claim 9, wherein the first body comprises at least one piece of sheet material (i) arranged to provide at least two load bearing facets which extend along the elongate bearing track member and (ii) configured such that the at least two load bearing facets bear between them a majority of the resultant force imparted into the at least one elongate bearing track member by the at least one bearing member of the second body due to the pre-load into the at least one elongate bearing track member.

12. The coordinate positioning apparatus as claimed in claim 9, configured such that, along a length of the elongate bearing track member, the resultant force due to the pre-load imparted into the at least one elongate bearing track member by the at least one bearing member of the second body, at a point of cooperation between the two, is directed so as to intersect an elongate target line that extends parallel to the elongate bearing track member, wherein:
   there are at least two points of cooperation between the at least one bearing member and the elongate bearing track member,
   the forces imparted onto the elongate bearing track member by the at least one bearing member at the at least two points of cooperation are configured to intersect the elongate target line, and
   the elongate target line is located in the vicinity of a notional elongate volume defined by an intersection of (i) a first pair of planes containing front and back surfaces of the material defining a first load bearing facet with (ii) a second pair of planes containing front and back surfaces of the material defining a second load bearing facet.

13. A method of manufacturing a beam for a coordinate positioning apparatus comprising bearing surfaces for a carriage moveable along the beam, the beam comprising a modular structure of at least one elongate corner member and at least one piece of sheet material which extends along the at least one elongate corner member and provides at least one load bearing facet, the method comprising:
- assembling the at least one corner member and the at least one piece of sheet material to provide the beam, the at least one corner member and the at least one piece of sheet material being separately-formed pieces; and
- subsequently machining the elongate corner member to provide a flat bearing surface.

14. The method as claimed in claim 13, wherein the beam comprises at least one bulkhead.

* * * * *